(12) United States Patent
Deng

(10) Patent No.: US 12,313,247 B2
(45) Date of Patent: May 27, 2025

(54) HIGH VOLTAGE DIRECT INSERT STRING LIGHTS

(71) Applicant: DONGGUAN YONGFENG LIGHT CO., LTD, Guangdong (CN)

(72) Inventor: Zhumei Deng, Dongguan (CN)

(73) Assignee: DONGGUAN YONGFENG LIGHT CO., LTD, Dongguan (CN)

( * ) Notice: Subject to any disclaimer, the term of this patent is extended or adjusted under 35 U.S.C. 154(b) by 78 days.

(21) Appl. No.: 18/505,591

(22) Filed: Nov. 9, 2023

(65) Prior Publication Data

US 2025/0146653 A1    May 8, 2025

(30) Foreign Application Priority Data

Nov. 6, 2023   (CN) .......................... 202311461940.6

(51) Int. Cl.
| | | |
|---|---|---|
| *B23K 1/00* | (2006.01) | |
| *F21S 4/10* | (2016.01) | |
| *F21V 23/00* | (2015.01) | |
| *F21Y 115/10* | (2016.01) | |

(52) U.S. Cl.
CPC .......... *F21V 23/001* (2013.01); *B23K 1/0016* (2013.01); *F21S 4/10* (2016.01); *F21Y 2115/10* (2016.08)

(58) Field of Classification Search
CPC ...... F21S 4/24; F21S 2/005; F21S 4/22; F21S 43/14; B23K 1/0016
See application file for complete search history.

(56) References Cited

U.S. PATENT DOCUMENTS

| | | | | |
|---|---|---|---|---|
| 6,371,637 | B1 * | 4/2002 | Atchinson | F21V 19/005 |
| | | | | 362/555 |
| 8,714,772 | B1 * | 5/2014 | Levante | F21V 23/06 |
| | | | | 362/249.02 |
| 8,736,527 | B2 * | 5/2014 | Verlinden | F21S 4/24 |
| | | | | 345/82 |
| 9,941,258 | B2 * | 4/2018 | Kong | F21K 9/232 |
| 10,591,114 | B1 * | 3/2020 | Lassen | F21V 15/013 |
| 10,832,832 | B2 * | 11/2020 | Walker | F21V 23/001 |
| 11,333,338 | B2 * | 5/2022 | Grave | F21S 4/24 |
| 11,499,700 | B1 * | 11/2022 | Tsai | F21S 4/10 |
| 11,808,416 | B1 * | 11/2023 | Chen | F21S 4/10 |
| 11,828,427 | B1 * | 11/2023 | Shao | F21S 4/15 |
| 2001/0036082 | A1 * | 11/2001 | Kanesaka | G09F 9/33 |
| | | | | 362/555 |
| 2008/0137332 | A1 * | 6/2008 | Lo | H05B 45/30 |
| | | | | 362/240 |
| 2009/0154156 | A1 * | 6/2009 | Lo | F21S 4/28 |
| | | | | 362/234 |
| 2010/0164409 | A1 * | 7/2010 | Lo | H05B 45/46 |
| | | | | 362/234 |

(Continued)

OTHER PUBLICATIONS

JP2015088221A1 computer English Translation (Year: 2015).*

*Primary Examiner* — Erin B Saad
(74) *Attorney, Agent, or Firm* — Enable IP, P.C.

(57) ABSTRACT

A method of making a string light is disclosed. The method includes providing a flat cable comprising at least 4 wires; soldering one or more light chips to at least 2 of the 4 wires of the flat cable; cutting the at least 2 of the 4 wires at a plurality of locations; and connecting a voltage reducing box to the wires.

19 Claims, 33 Drawing Sheets

(56) References Cited

U.S. PATENT DOCUMENTS

| | | | | |
|---|---|---|---|---|
| 2013/0120979 | A1* | 5/2013 | Chen | F21V 21/005 |
| | | | | 362/217.17 |
| 2014/0334142 | A1* | 11/2014 | Levante | F21S 4/22 |
| | | | | 362/222 |
| 2015/0241034 | A1* | 8/2015 | Dankelmann | F21S 4/28 |
| | | | | 29/592.1 |
| 2016/0172786 | A1* | 6/2016 | Sussman | H01R 12/53 |
| | | | | 439/449 |
| 2016/0356441 | A1* | 12/2016 | Simmons | F21S 4/24 |
| 2018/0048105 | A1* | 2/2018 | MulHolland | B23K 3/063 |
| 2018/0172045 | A1* | 6/2018 | Hill | B23K 35/0288 |
| 2018/0354231 | A1* | 12/2018 | Iwase | B32B 15/016 |
| 2019/0039119 | A1* | 2/2019 | Li | B21J 15/025 |
| 2020/0088392 | A1* | 3/2020 | DeMayo | F21S 4/24 |
| 2021/0190303 | A1* | 6/2021 | Diana | F21V 23/005 |
| 2023/0072195 | A1* | 3/2023 | Bartek | H01R 25/162 |
| 2023/0187419 | A1* | 6/2023 | Wenmaekers | H05K 3/3426 |
| | | | | 257/100 |
| 2023/0358376 | A1* | 11/2023 | Liu | F21V 23/002 |
| 2024/0074016 | A1* | 2/2024 | Yang | H05B 45/46 |
| 2024/0093841 | A1* | 3/2024 | Xiong | F21V 23/005 |
| 2024/0114608 | A1* | 4/2024 | Liu | H05B 47/155 |

\* cited by examiner

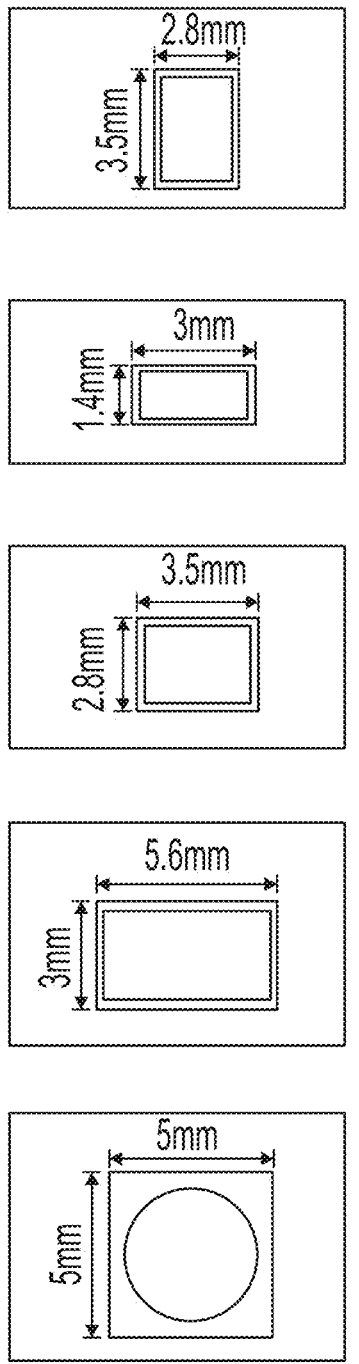
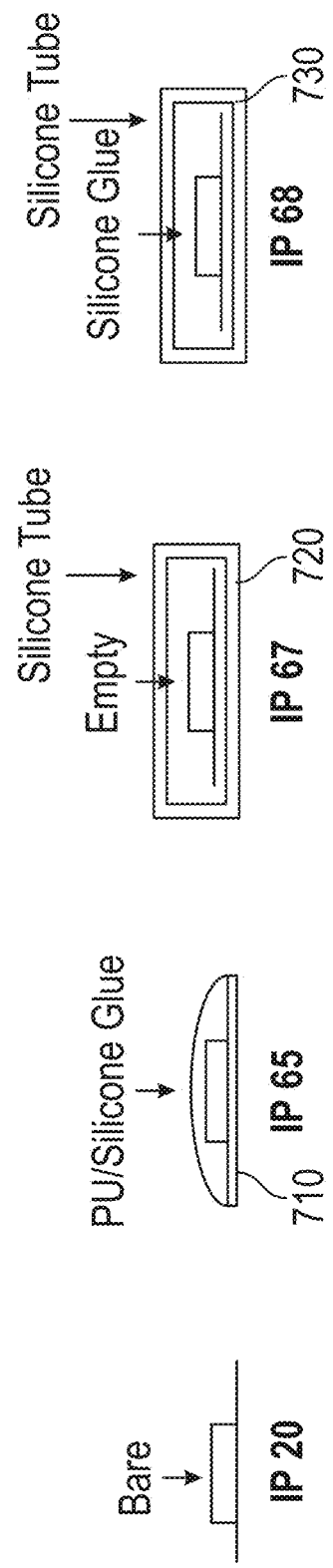
FIG. 7

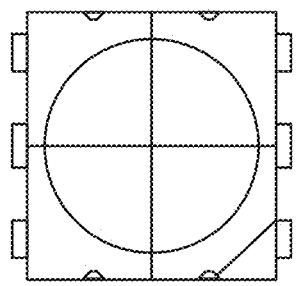
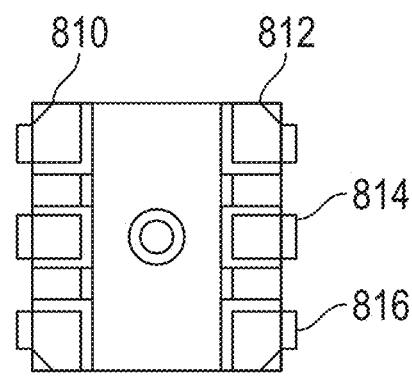
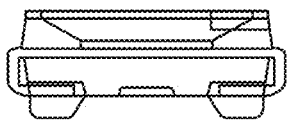
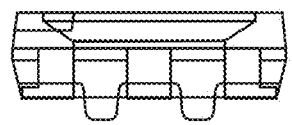
FIG. 8B
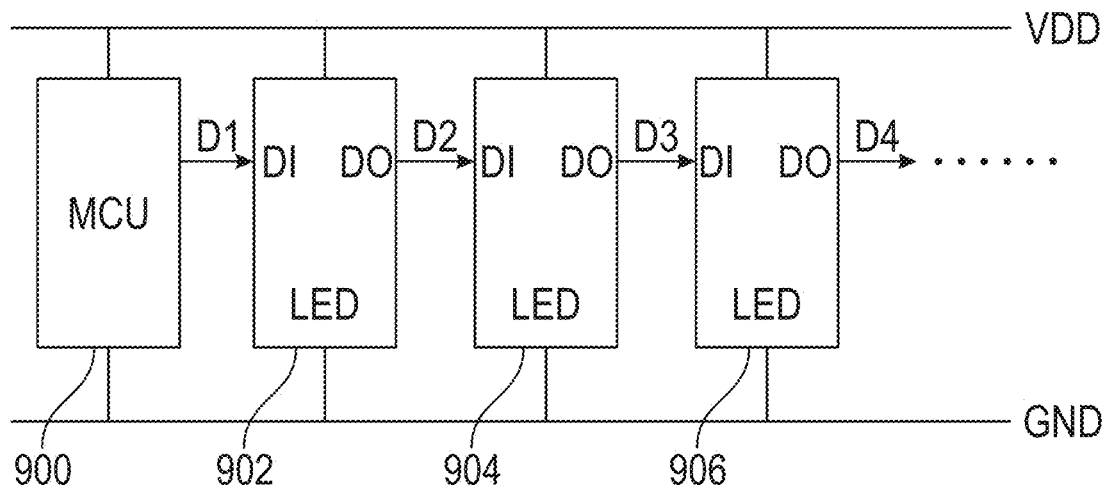
FIG. 9

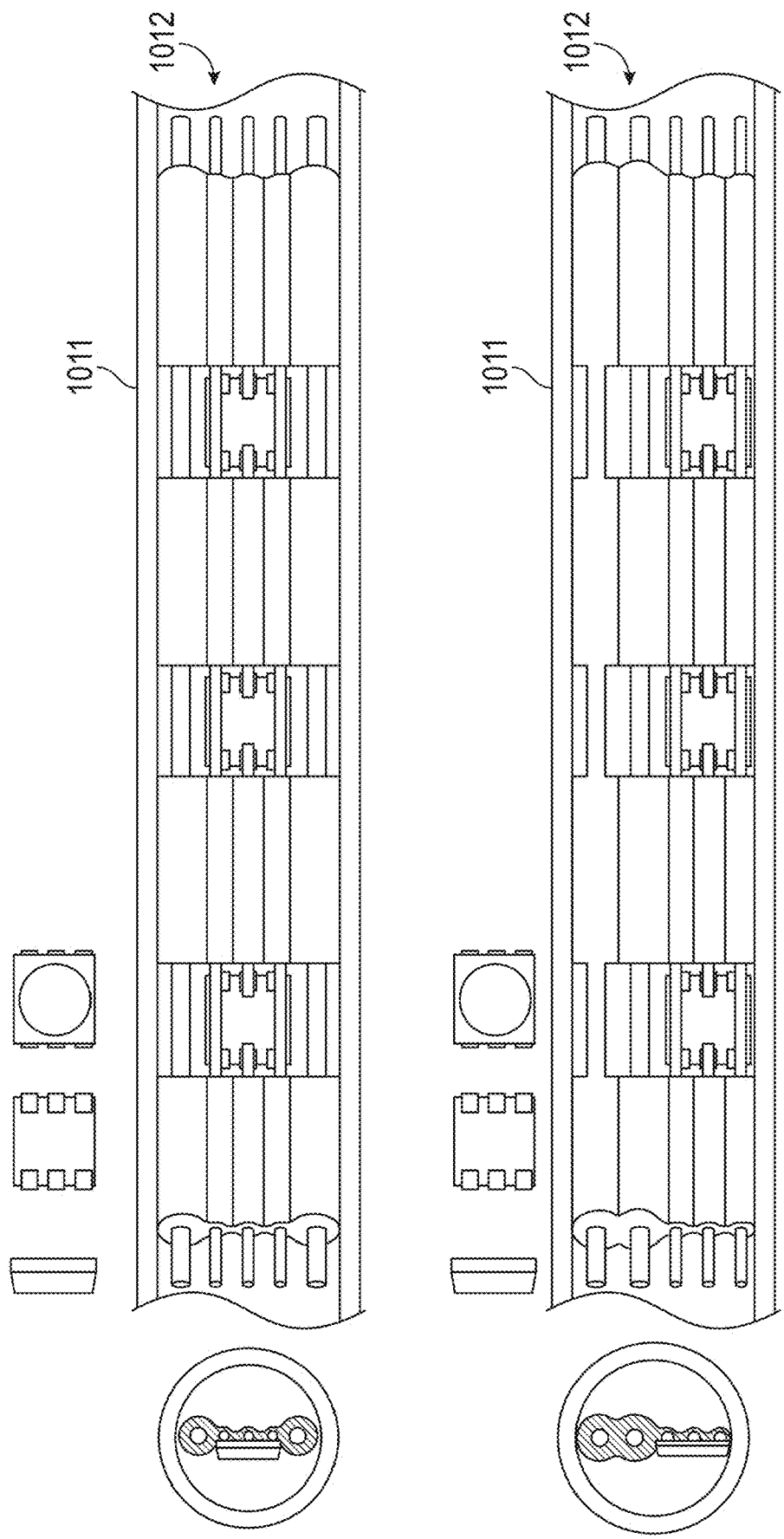

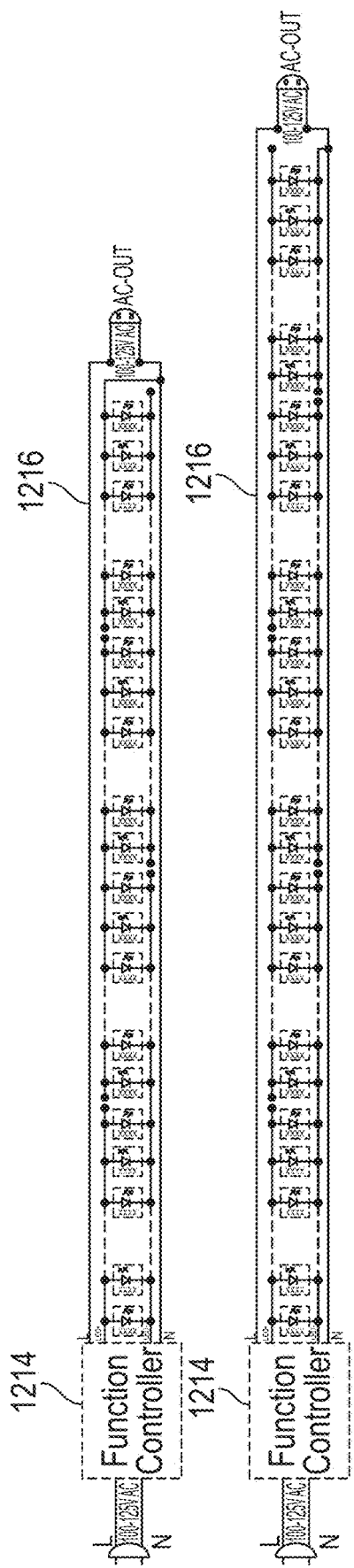
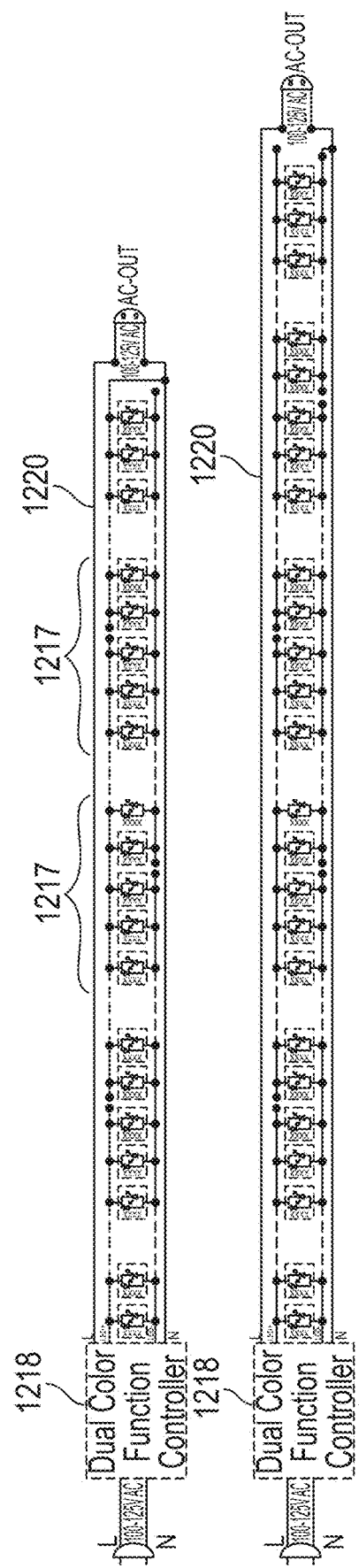
FIG. 12D
FIG. 12E

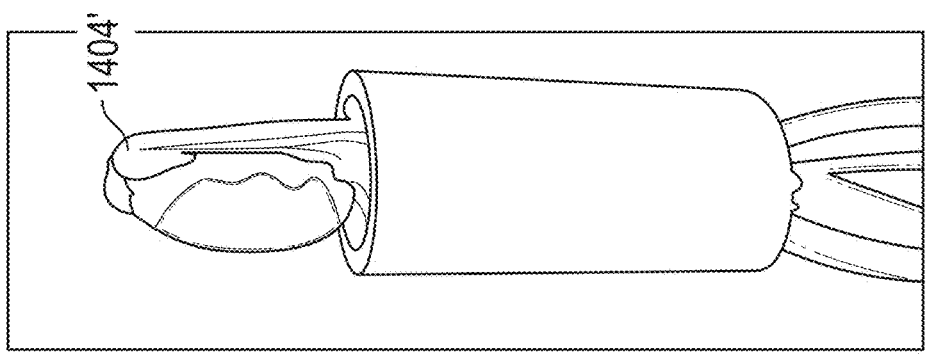
FIG. 14B
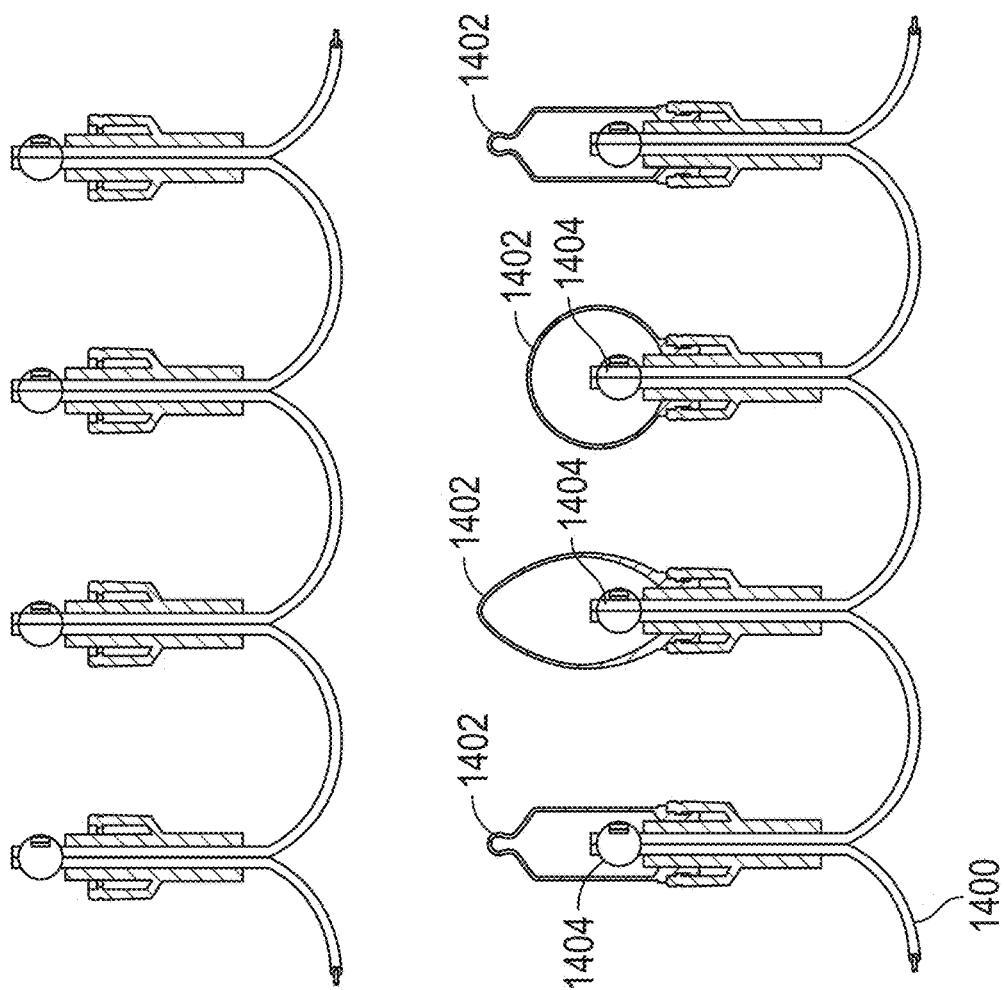
FIG. 14A
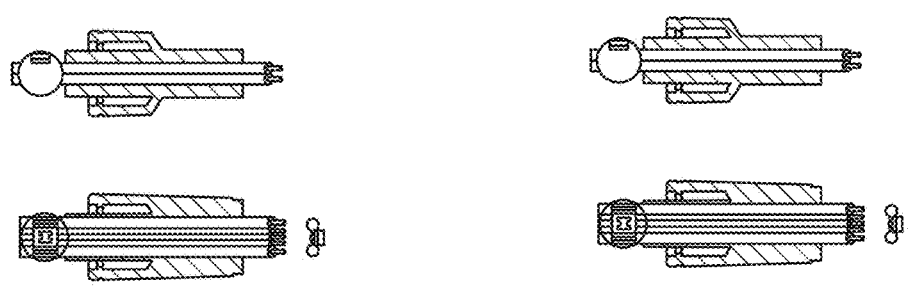

HIGH VOLTAGE DIRECT INSERT STRING LIGHTS

CROSS-REFERENCE

This application claims the priority of Chinese patent application no. 202311461940.6, filed on Nov. 6, 2023, the content of which is incorporated by reference herein in its entirety for all purposes.

FIELD

This relates generally to string lights, and more particularly, to flat cable string lights that can be connected in series and be plugged directly into a high-voltage outlet and produced in large-scale using a mechanized production method.

BACKGROUND

Traditional manufacturing of string lights using mass mechanized production methods does not offer the flexibility of customization of the string lights. Customized string lights cannot be manufactured in mass with existing mechanized production methods. A flexible way of mass production of string lights through mechanized production is desired.

SUMMARY

According to embodiments of the disclosure, flat cable string lights can be mass produced and customized by soldering light emitting diode ("LED") chips to some of the wires in a flat cable string, cutting off part of these wires to form a series connection of sets of LED lights, and adjusting the voltage of these lights through a combination of resistors and/or capacitors to allow the light string to be directly plugged into, for example, a 100V-230V power supply. The string lights can be made using flat cables with different numbers of wires (e.g., 4-wire or 5-wire flat cables) and LED chips of various sizes. Various types of function controllers can be incorporated into the string lights to produce different lighting schemes.

BRIEF DESCRIPTION OF THE DRAWINGS

FIG. 7 illustrates exemplary LED chips and waterproofed versions of these LED chips that can be used in the embodiments of the disclosure.

FIGS. 8a and 8b illustrate the structures of two different LED chips.

FIG. 9 illustrates an exemplary circuit diagram illustrating the parallel connection of multiple LEDs and a multifunctional control unit that form a string light, according to an embodiment of the disclosure.

FIG. 14a is a schematic diagram of an exemplary assembly of the LED light strip with light heads and outfits, according to an embodiment of the disclosure.

FIG. 14b illustrates an exemplary LED light 1404' of FIG. 14a, according to an embodiment of the disclosure.

DETAILED DESCRIPTION

Embodiments of the present disclosure will be described below in conjunction with the accompanying drawings, but it should be appreciated by those skilled in the art that the embodiments described below are exemplary, rather than exhaustive. They are only used to illustrate the present disclosure and should not be regarded as limiting the scope of the present disclosure. All other embodiments obtained by those of ordinary skill in the art without creative efforts based on the embodiments disclosed herein shall fall within the scope of the present disclosure.

In one aspect of the disclosure, a method of making a light string with LED chips is disclosed.

Figure 1:
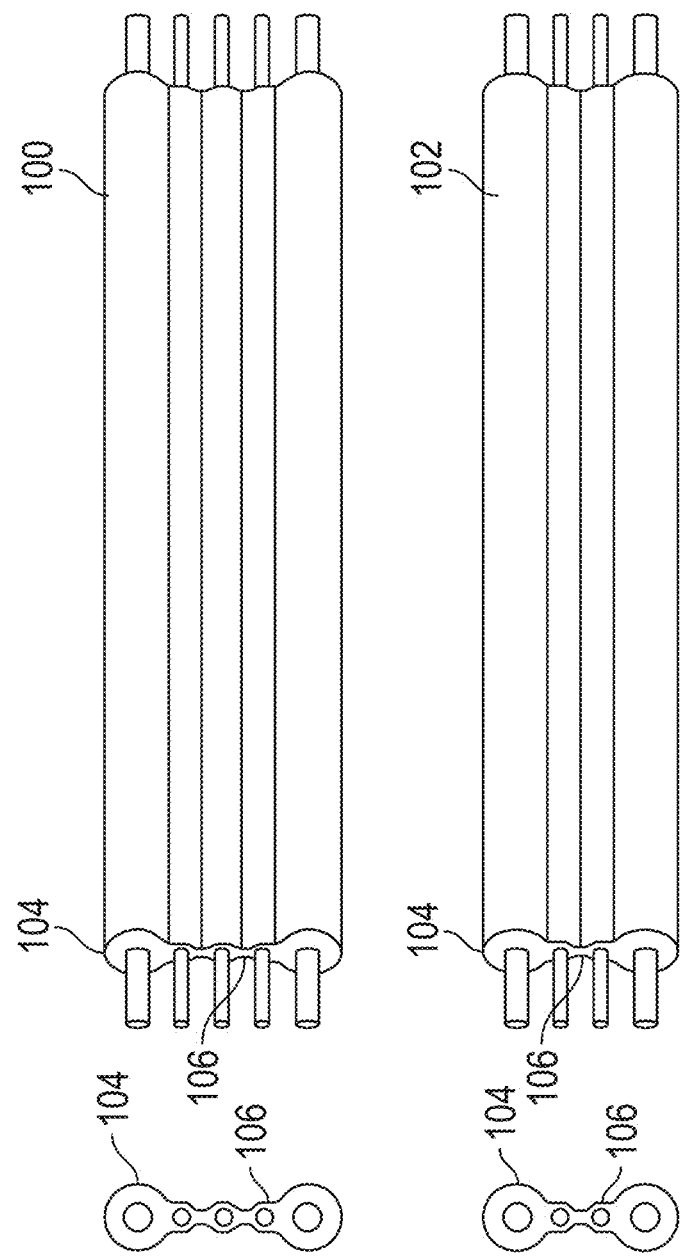
FIG. 1 illustrates an example of a 5-wire flat cable and an example of a 4-wire flat cable, either of which can be used to make a string light, according to embodiments of the disclosure.

First, a flat cable with multiple wires can be provided. FIG. 1 illustrates an example of a 5-wire flat cable 100 and an example of a 4-wire flat cable 102, either of which can be used to make a string light, according to the embodiments. The flat cables 100, 102 can include copper wires of different sizes based on the requirements of the string light. The copper wires can be wrapped with polyvinyl chloride ("PVC") and isolated from each other. In both examples shown in FIG. 1, the diameter of the outer wires 104 can be between 1.5-3.0 mm. Each outer wire 104 can include 16 or 17 0.16 mm copper wires. The diameter of the inner wires 106 can be between 0.5-3.0 mm. Each inner wire 106 can include 7 0.12-0.15 mm copper wires. It should be understood that different sized copper wires and different number of wires can be used in various embodiments.

As illustrated in FIG. 1, the inner three wires 106 in the 5-wire flat cable 100 are relatively thin compared to the outer two wires 104. Similarly, the middle two wires 106 in the 4-wire flat cable 102 are relatively thin compared to the outer two wires 104. These wires 104, 106 can be used for parallel connection of LED chips or as signal wires. In both embodiments of FIG. 1, the outer diameter size and inner copper wire specifications can be adjusted according to the requirements of the string lights made from these flat cables.

Figure 2:
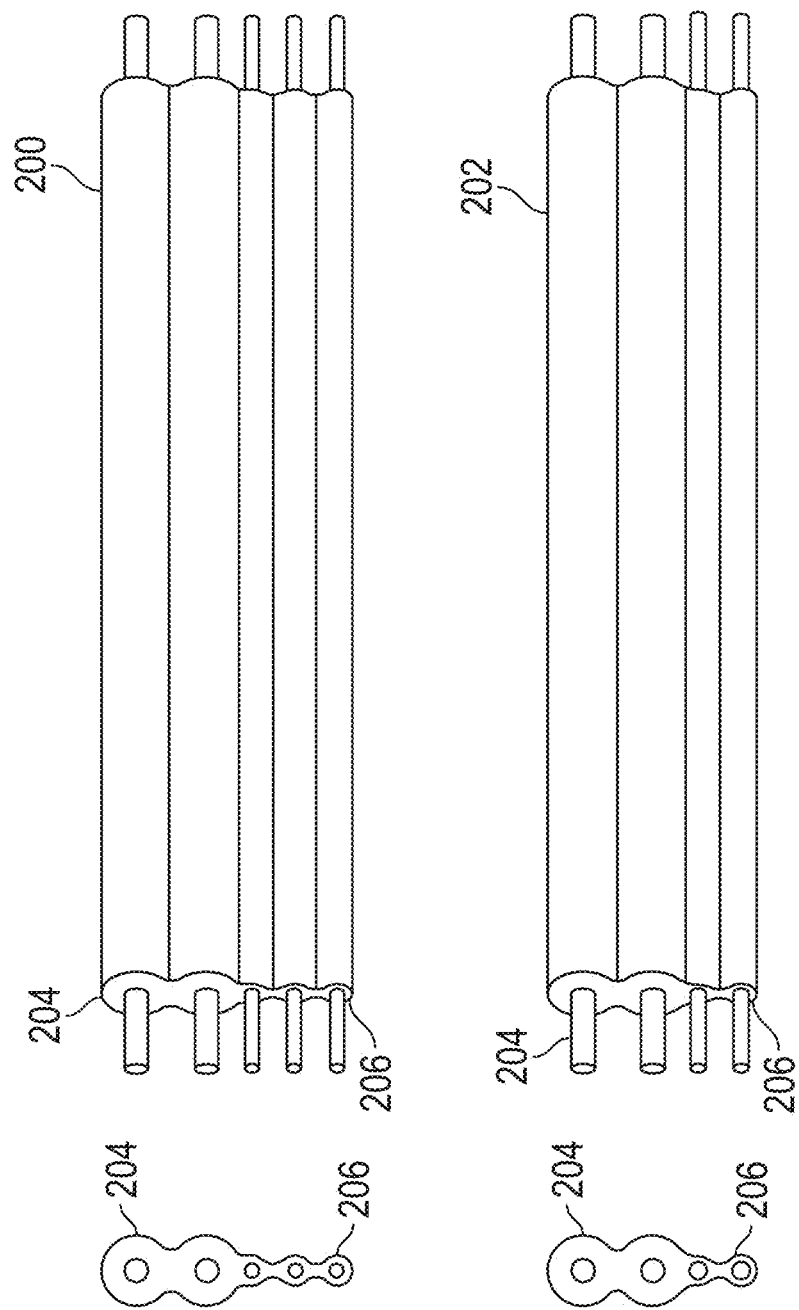
FIG. 2 illustrates two alternative variations of the flat cables that can be used for making string lights, according to embodiments of the disclosure.

FIG. 2 illustrates two alternative variations of the flat cables that can be used for making string lights, according to embodiments of the disclosure. As shown in FIG. 2, the two wires 204 on one side of the 5-wire flat cable 200 are relatively thick compared to the three wires 206 on the other side. The size of the wires can be adjusted according to needs. In one example, the outer diameter of each of the two thick wires 204 can be 1.5-3.0 mm. Each of the outer wires can include 16 or 17 0.16 mm copper wires. The three wires 206 on the other side of the 5-wire flat cable 200 are relatively thin compared to wires 204, as shown in FIG. 2. Similarly, the two wires 206 on one side of the 4-wire flat cable 202 are relatively thin compared to the two wires 204 on the other side of the 4-wire flat cable 202. The outer diameter of each of the wires 206 can range from 0.5-3.0 mm. Each of the wires 206 can include 7 0.12-0.15 mm copper wires. The wires of the flat cable 200, 202 of FIG. 2 can be used to connect LED chips or signal lines in parallel. The outer diameter of the wires and the specification of the inner copper wires can vary according to specific requirements.

The next step, LED chips are soldered to the flat cable. FIGS. 3-6 illustrate this step being performed on the variation of the 5-wire and 4-wire flat cables of FIGS. 1 and 2.

Figure 3:
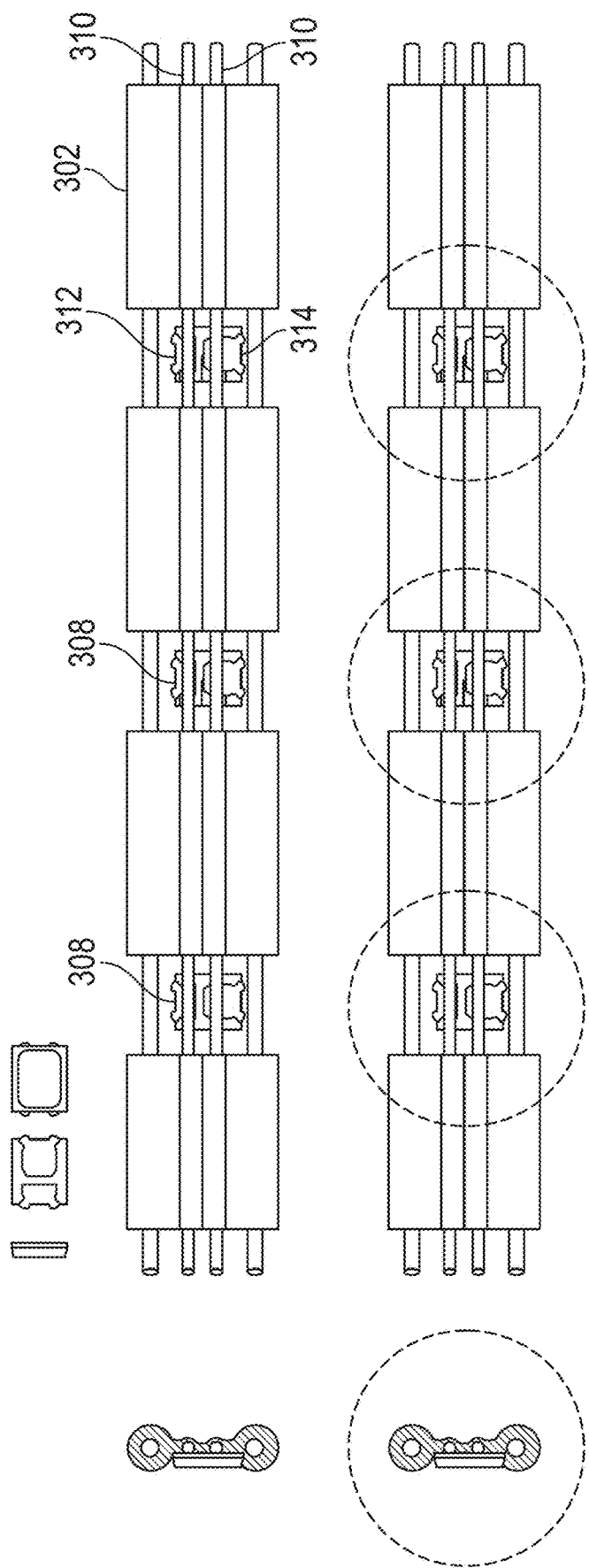
FIGS. 3-6 illustrate LED chips being soldered to the wires of various types of flat cables, according to embodiments of the disclosure.

FIG. 3 illustrates LED chips 308 soldered to a 4-wired flat cable 302. In this embodiment, the LED chips 308 can be SMD LED chips (e.g., 2835 SMD LED chips). The two poles 312, 314 of each of the SMD LED chips 308 is soldered to the two thin wires 310 in the middle of the 4-wire flat cable 302, respectively. Pot glue can then be used for fixing and protecting the LED chips 308. The shape of the potting can be molded.

Figure 4:
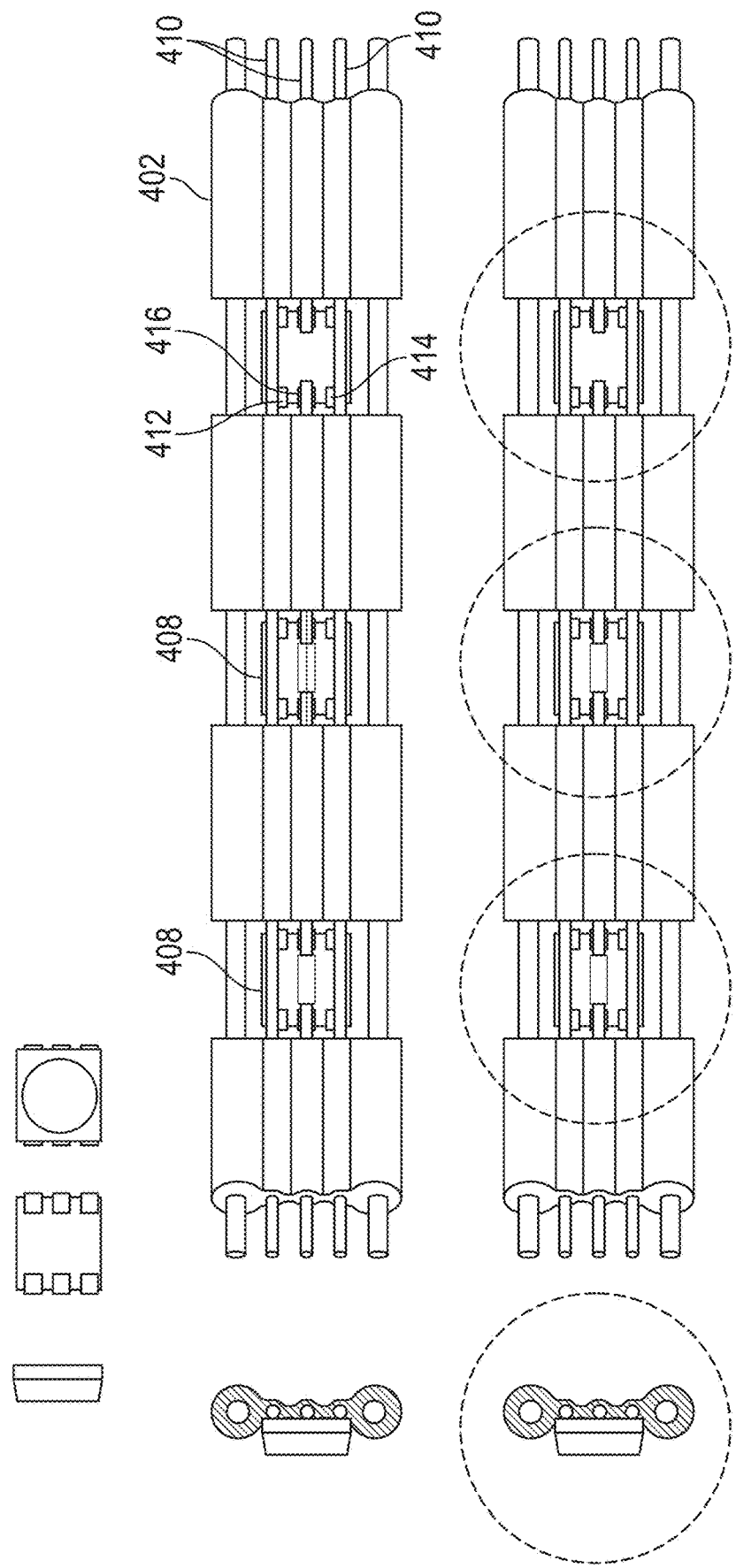

FIG. 4 illustrates the same process being performed on a 5-wired flat cable. As illustrated in FIG. 4, the poles 412, 414, 416 of the SMD LED chips 408 (e.g., 3939 SMD LED chips) are soldered to the three thin wires 410 in the middle of the 5-wire flat cable 402. Pot glue can then be used for fixing and protecting the LED chips 408. The shape of the potting can be molded.

Figure 5:
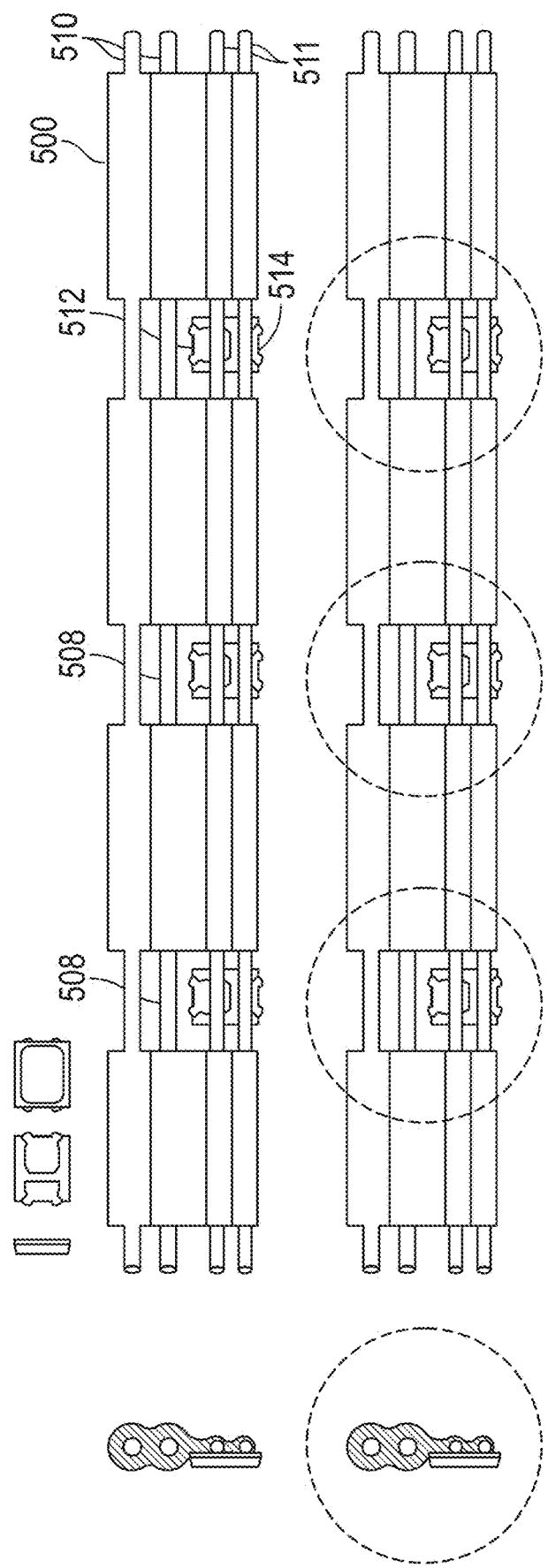

FIG. 5 illustrates the same process being performed on a 4-wired flat cable 500 with two thick wires 510 on one side and two thin wires 511 on the other side. The two poles 512, 514 of each of the SMD LED chips 508 (e.g., 2035 SMD LED chips) are soldered to two the thin wires 511 on one side of a 4-wire flat cable 500, connecting the wires 511 in parallel. Pot glue can then be used for fixing and protecting the LED chips 508. The shape of the potting can be molded.

Figure 6:
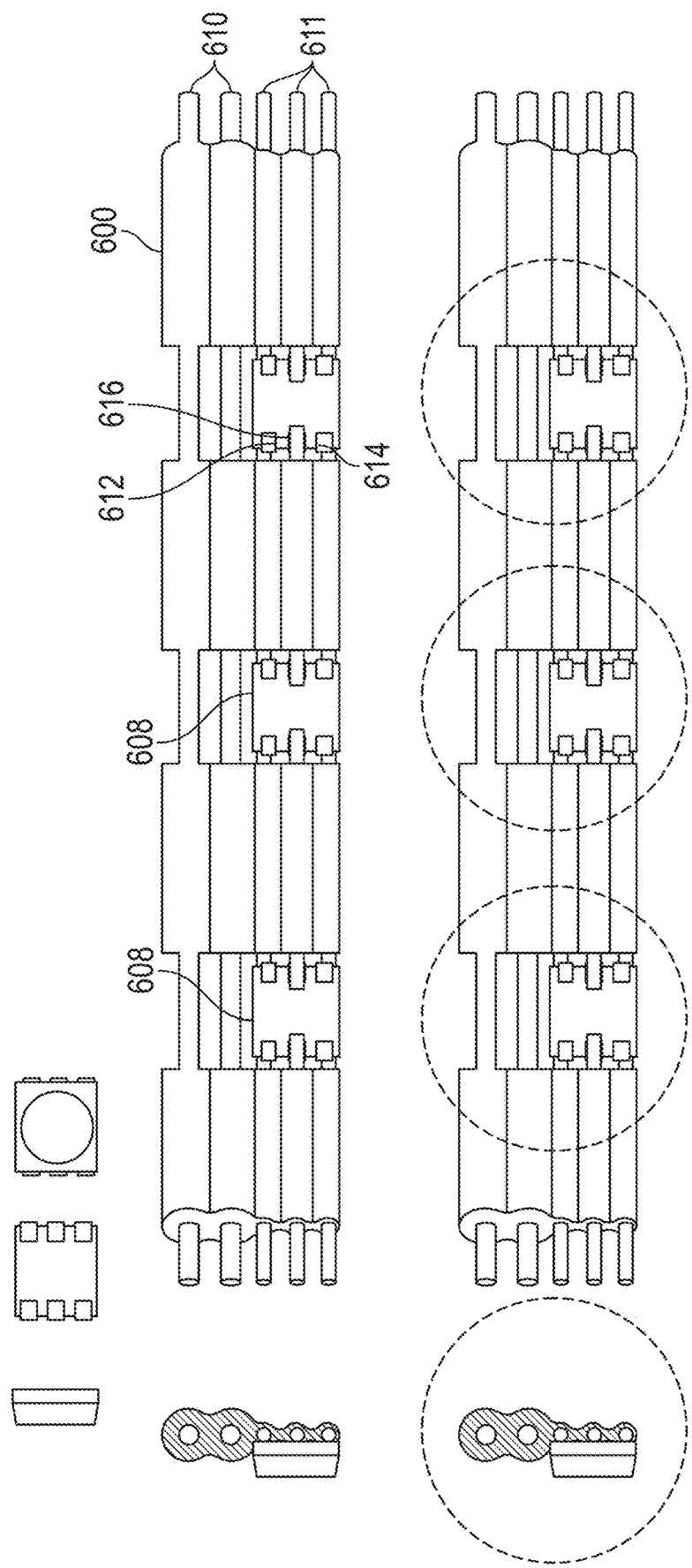

FIG. 6 illustrates the same process being performed on a 5-wired flat cable 600 with two thick wires 610 on one side and three thin wires 611 on the other side. The poles 512, 614, 616 of each SMD LED chip 608 (e.g., 3939 SMD LED chips) are soldered to the three thin wires 611 on one side of a 5-wire flat cable 600, connecting the wires 61 in parallel. Pot glue can then be used for fixing and protecting the LED chips 608. The shape of the potting can be molded.

The LED chips that are connected by the flat wires in the examples shown in FIGS. 3-6 can be of various sizes, including but not limited to models: 5050 SMD, 5630 SMD, 3528 SMD, 3014 SMD, 3014 SMD, 2835 SMD, 2024 SMD, 3939 SMD, 3233 SMD, some of which are shown in FIG. 7. FIG. 7 also illustrates a few different types of waterproof version of these LED chips including one encapsulated by Polyurethane/silicone glue 710, one housed in a silicone tube 720, and another covered by silicone glue and housed in a silicone tube 730.

Figure 8A:
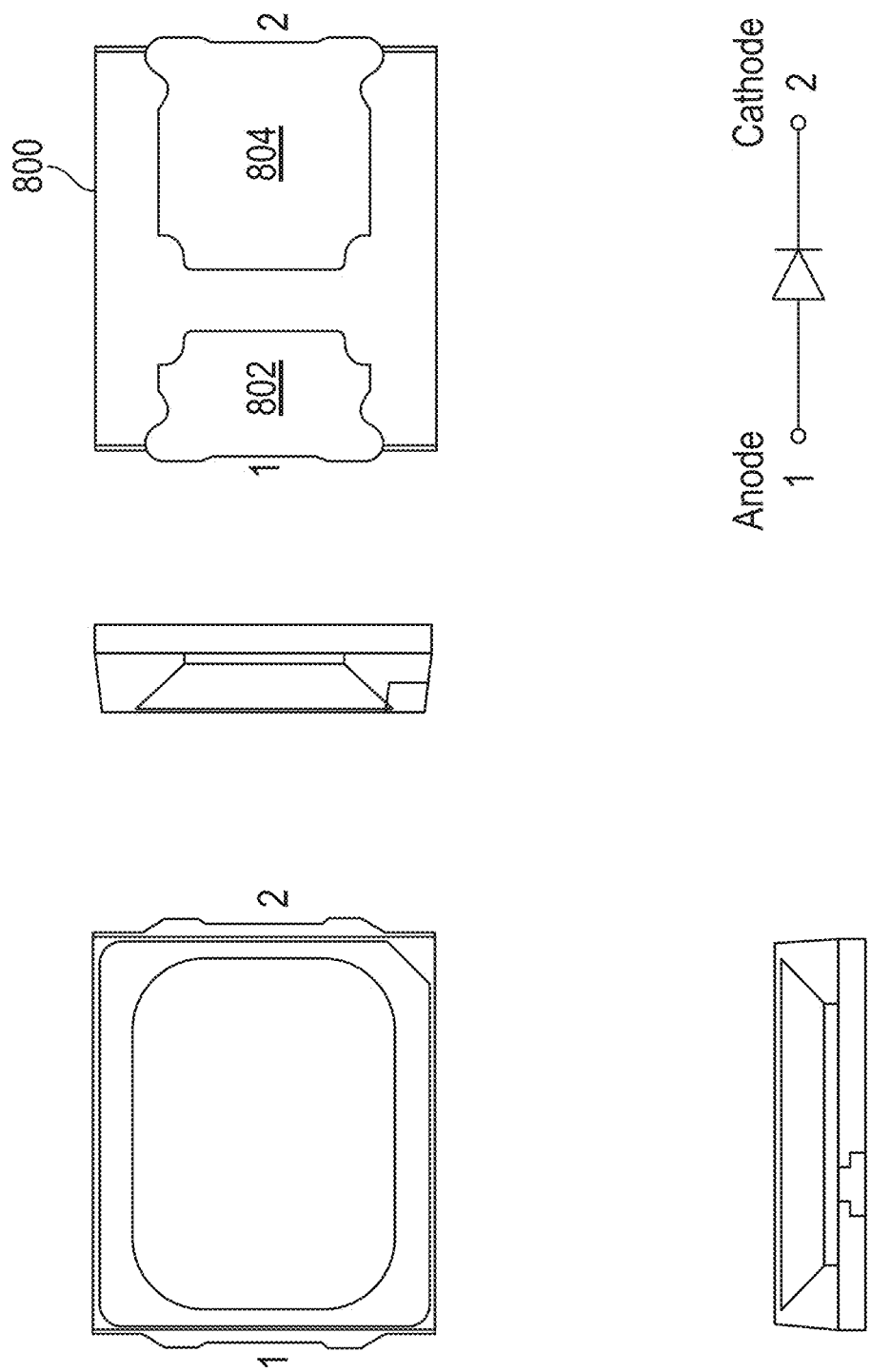

FIGS. 8a and 8b illustrate the structures of two different LED chips. FIG. 8a illustrates a 2835 SMD LED chip 800 with two poles 802, 804. Specifically, the anode 802 and cathode 804 can be soldered on two of the wires in a 4-wire flat cable as shown in FIGS. 3 and 5.

FIG. 8b illustrates a 3939 SMD LED chip 810 having GND (ground) 812, VDD (5 volt power) 814, and DIN (data input) 816. Each of GND 812, VDD 814, and DIN 816 can be soldered on one of the wires in a 5-wire flat cable as shown in FIGS. 4 and 6.

FIG. 9 illustrates an exemplary circuit diagram illustrating the parallel connection of the LEDs 902, 904, 906 and a multifunctional control unit 900 that form a string light. It should be understood that the mechanisms of attaching the LED chips to a flat cable according to the embodiments can work with any number of LED chips, which allows the string light to be made with any number of LEDs.

Figure 10A:
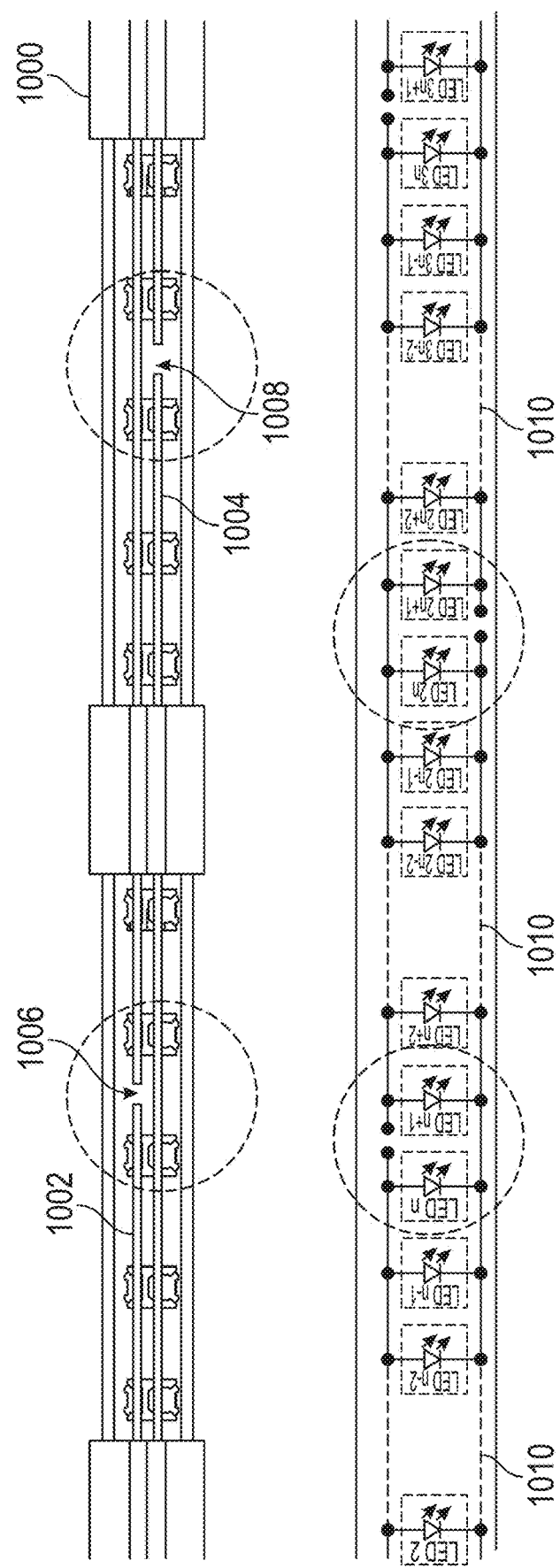
FIG. 10a illustrates an open circuit formed on a flat cable by cutting some of the wires at certain locations, according to an embodiment of the disclosure.
Figure 10B:
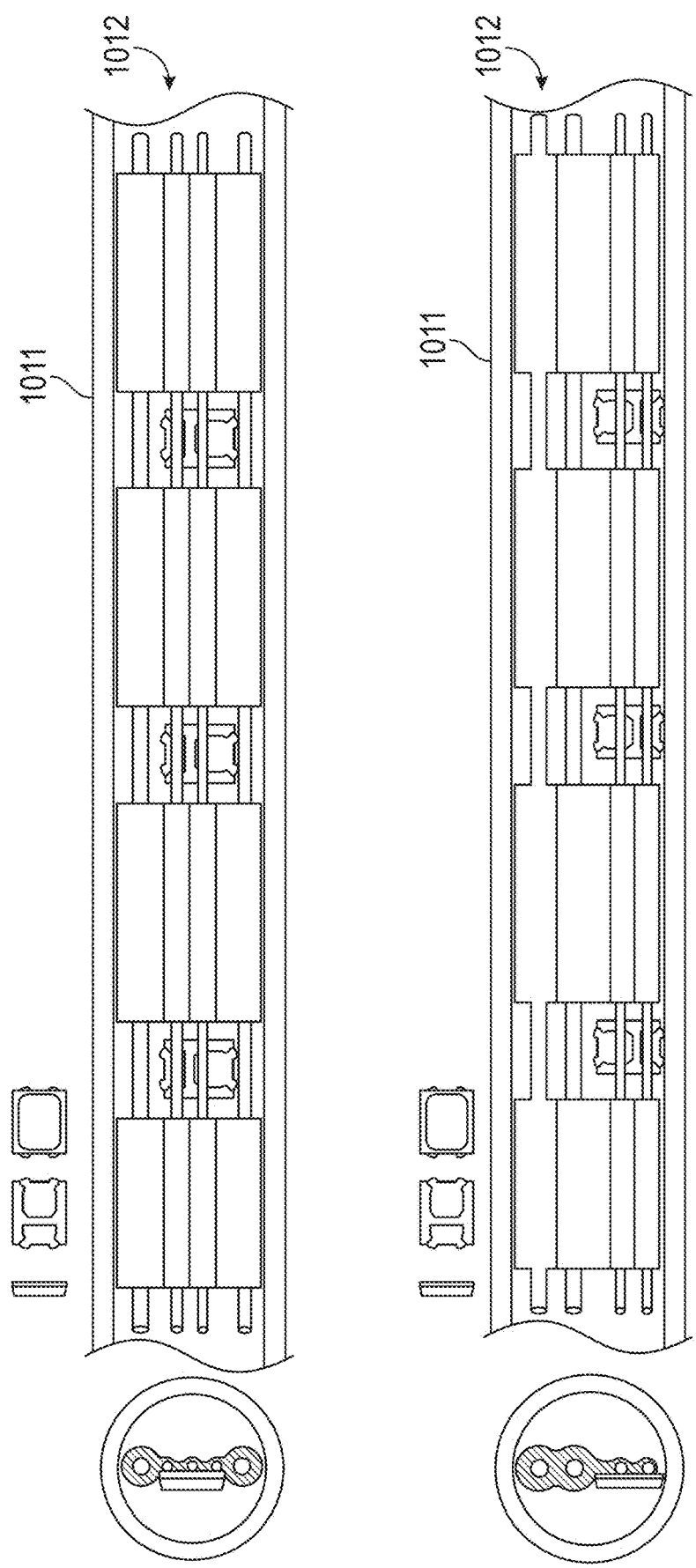
FIG. 10b illustrates an exemplary tube light, according to an embodiment of the disclosure.

After the LED chips are soldered on the flat cable as shown in FIGS. 3-6, parts of the flat cable 1000 (e.g., some of the wires 1002, 1004) is cut at certain locations 1006, 1008 so as to form an open circuit 1010 (see FIG. 10a). The flat cable can be cut by, for example, a cutting machine, laser, heat, or other suitable processes. In one embodiment, an extruder can be used for processing an outer layer (e.g., 1011 in FIG. 10b) that can form a tube light 1012 with the light string being enclosed by the outer layer 1011.

Figure 11:
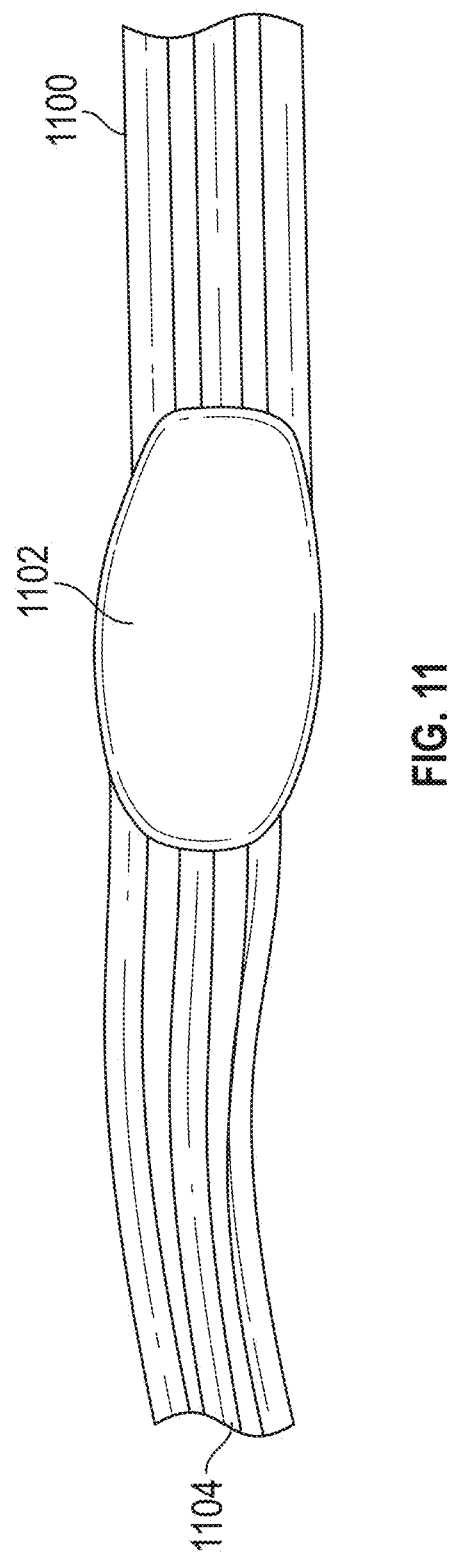
FIG. 11 illustrates an exemplary string light manufactured according to an embodiment of the disclosure.

FIG. 11 illustrates an exemplary string light 1100 manufactured according to the methods disclosed herein. The string light 1100 can include one or more LED chips 1102 soldered on a flat cable 1104.

Figure 12A:
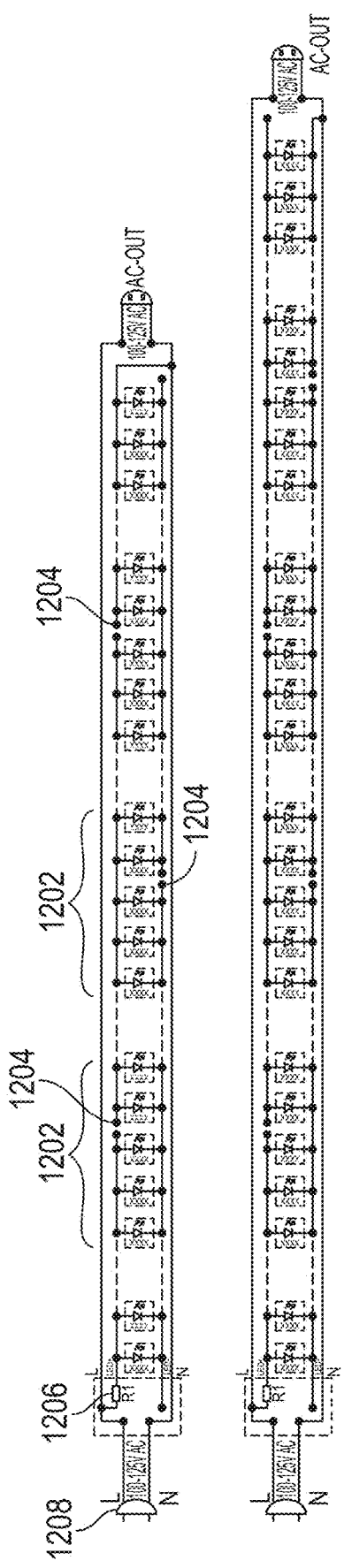
FIGS. 12a-12p are circuit diagrams illustrating the exemplary circuits of various light strings, according to embodiments of the disclosure.
Figure 12B:
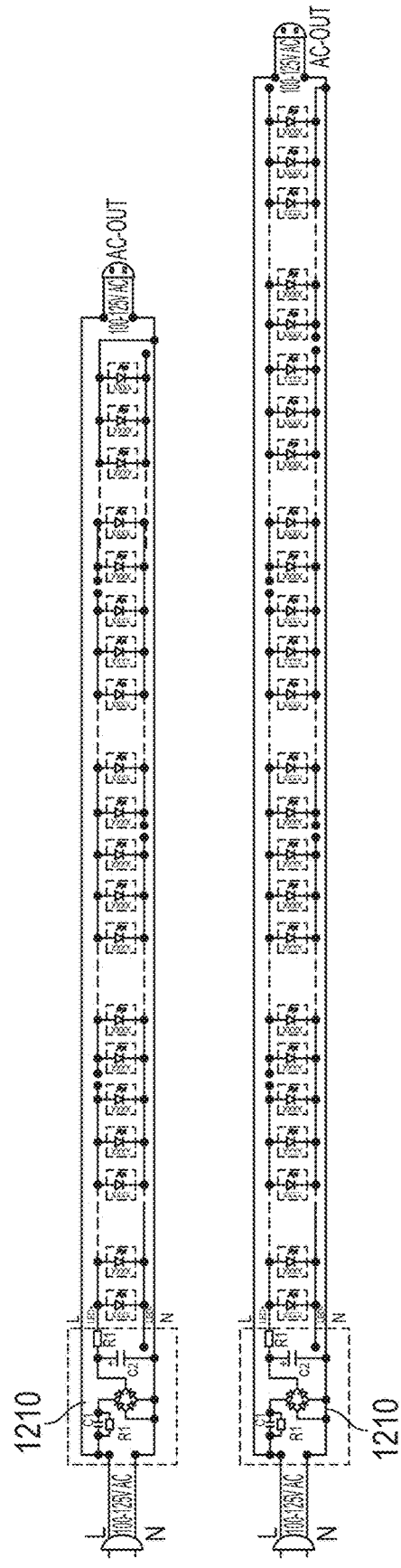
Figure 12C:
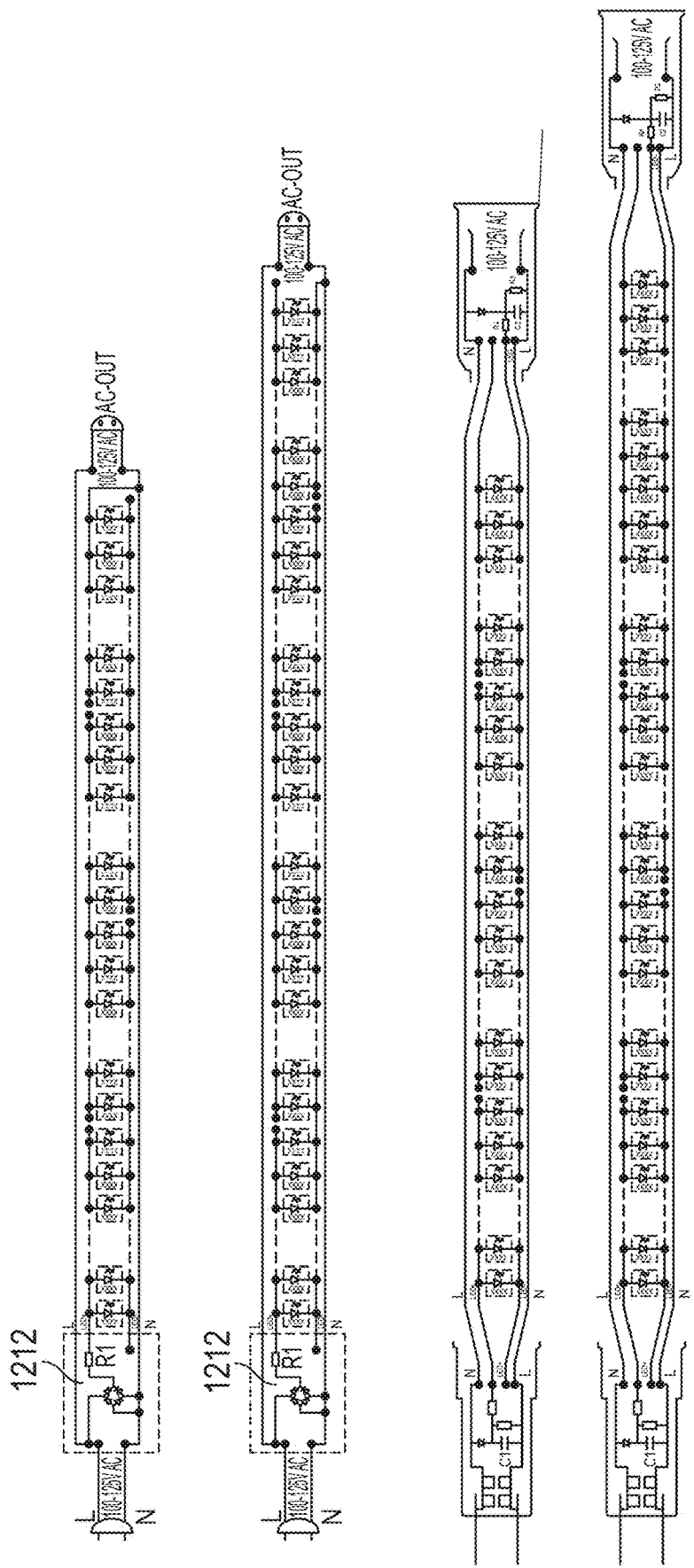
Figure 12F:
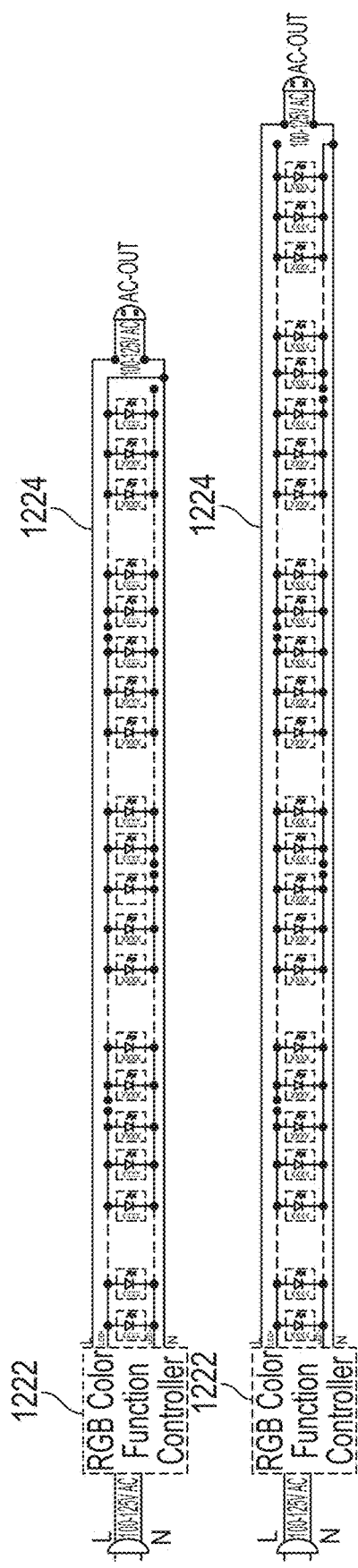
Figure 12G:
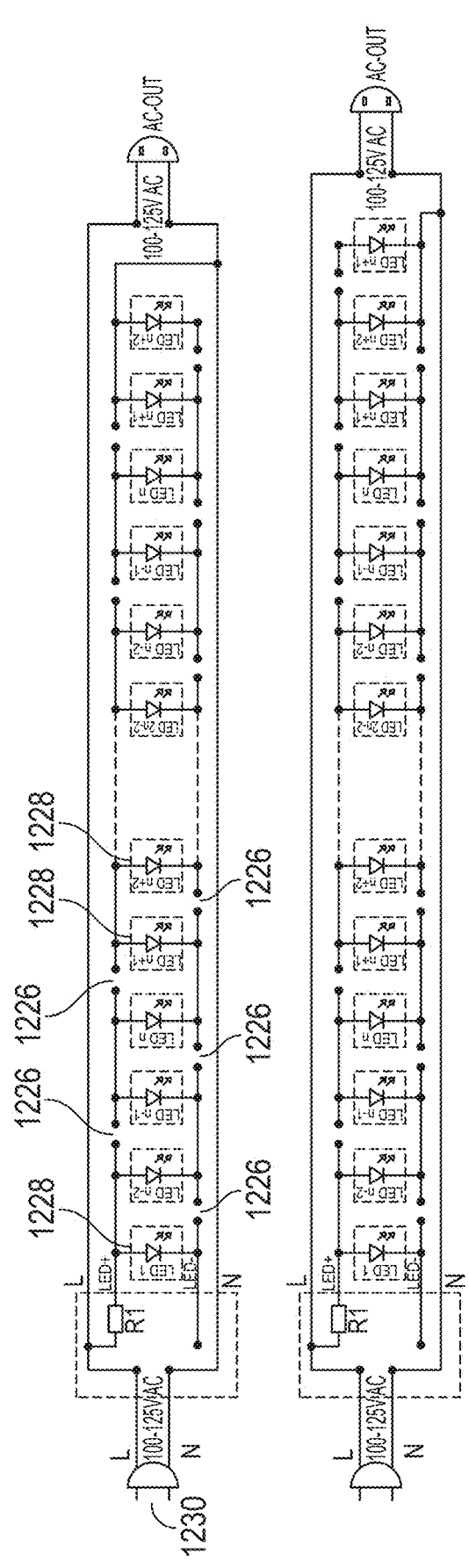
Figure 12H:
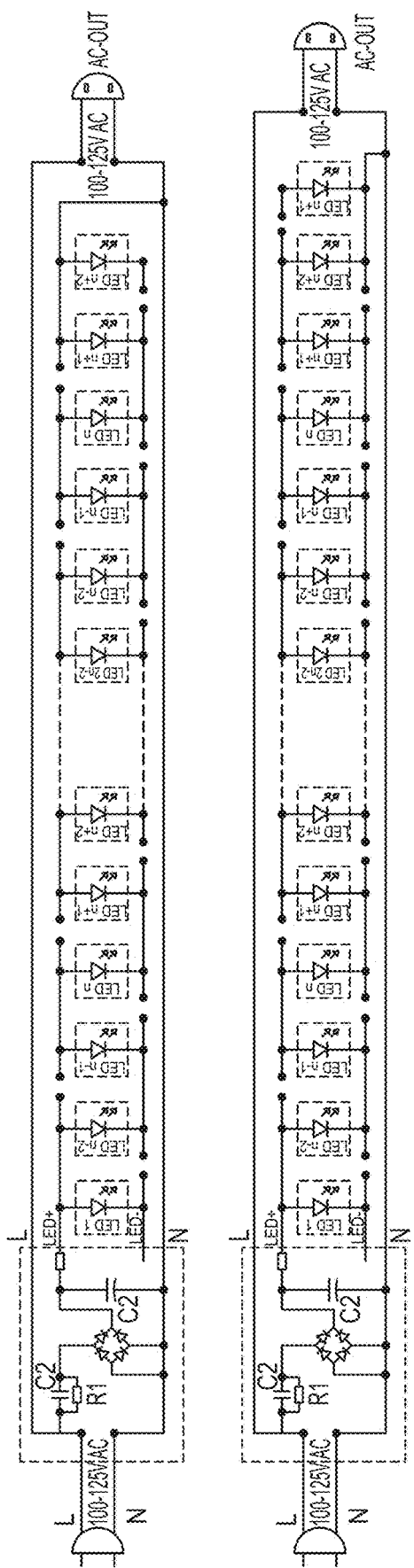
Figure 12I:
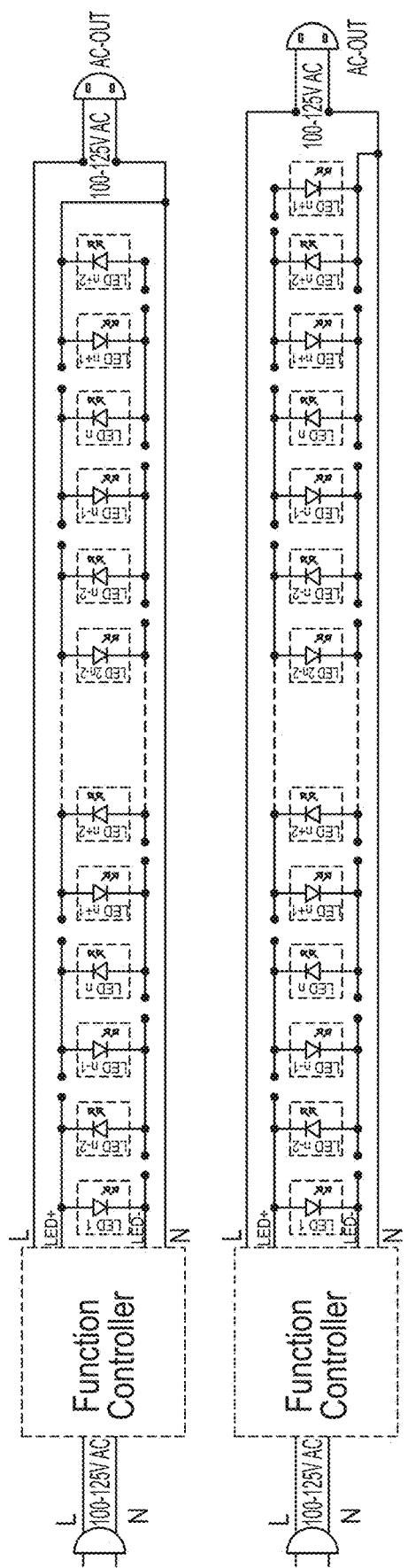
Figure 12J:
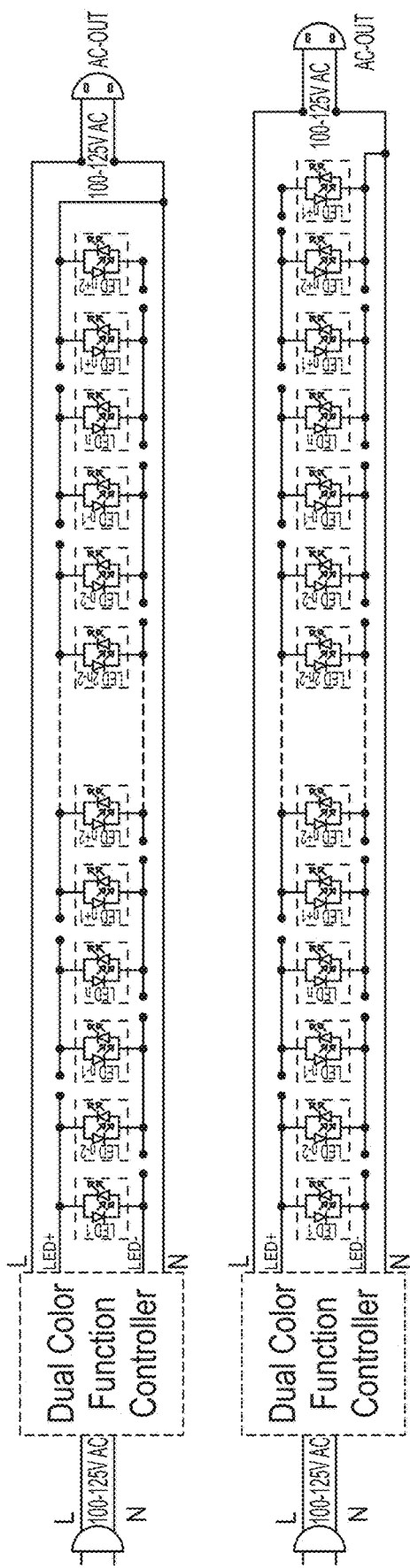
Figure 12K:
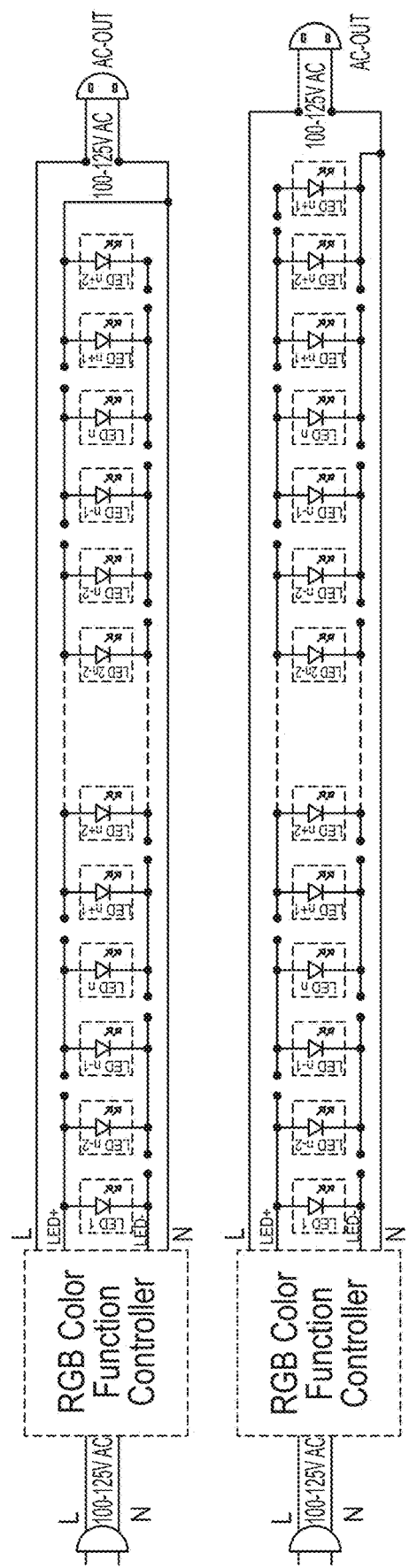
Figure 12L:
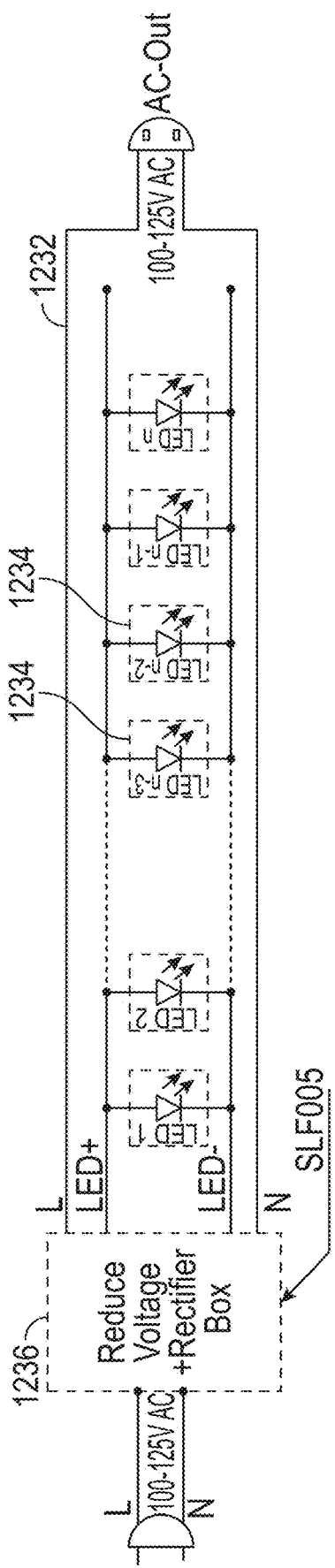
Figure 12M:
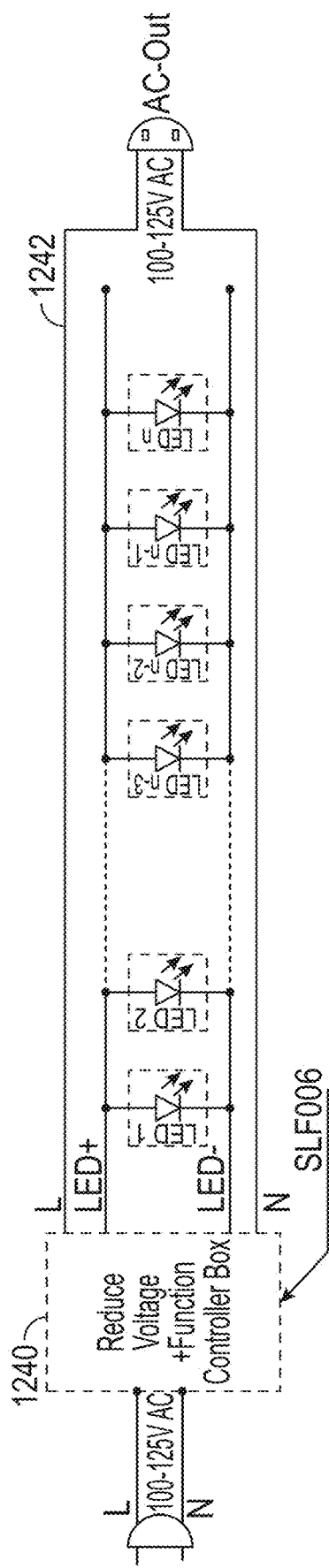
Figure 12N:
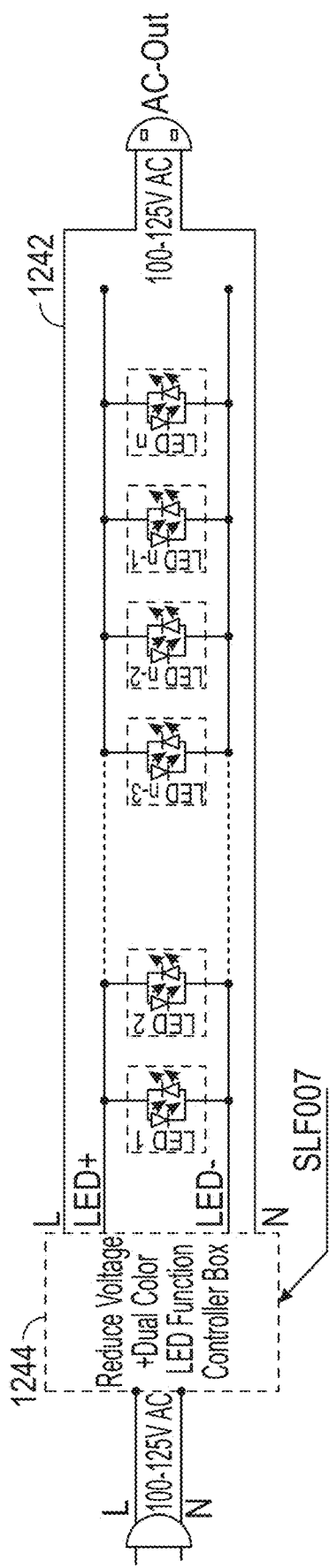
Figure 12O:
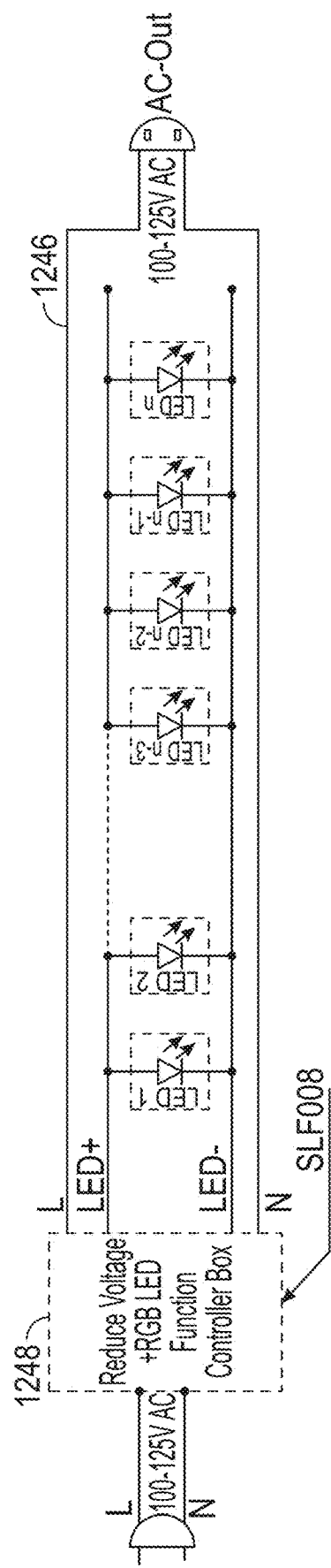
Figure 12P:
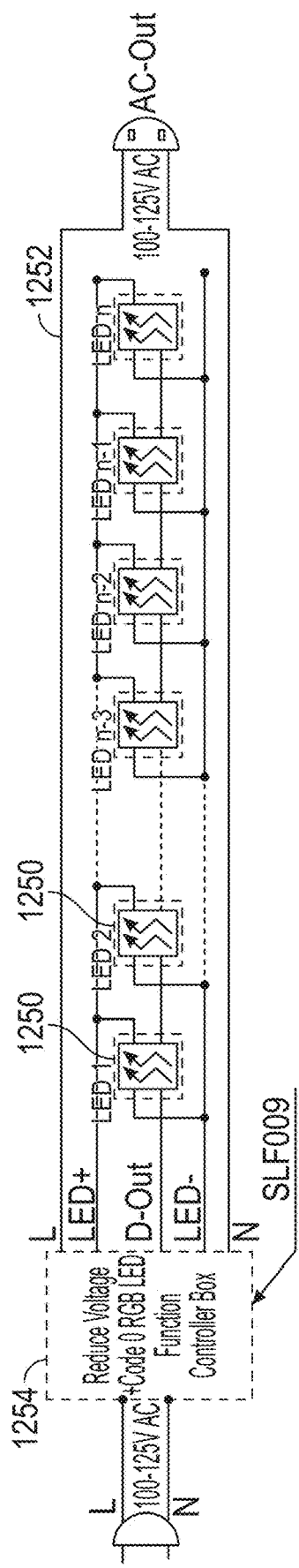

FIGS. 12a-12p illustrate circuit diagrams of various embodiments of the light strings, according to the embodiments of the disclosure.

FIG. 12a illustrates circuit diagrams of exemplary light strings produced according to an embodiment of the disclosure. The light string of FIG. 12a uses a 4-wire flat cable. Using the methods described above, n two-poled LEDs (collectively 1202) can be first connected in parallel. The wires connecting the LEDs are cut off at certain positions 1204, forming series connections of x sets of n LED lights 1202. Finally, the voltage is reduced using a resistor 1206 so the light string can be directly plugged into a 100V-230V power supply 1208 to allow the LEDs of the light string to lit up in multiple consecutive series. In one embodiment, "n" may represent any number between 1 and 100 and "x" may represent any number between 2 and 100.

FIG. 12b illustrates circuit diagrams of exemplary light strings similar to those shown in FIG. 12a but using a combination of resistors and capacitors 1210 instead of a single resistor to reduce voltage and create a different scheme of the LED light string.

FIG. 12c illustrates circuit diagrams of exemplary light strings similar to those in FIGS. 12a and 12b but using a different combination of resistors and capacitors 1212 to reduce voltage and create another different scheme of the LED light string. In one embodiment, the ends of the light strings 1213 can incorporate a special fused current tap and a cord connector body 1211.

FIG. 12*d* illustrates circuit diagrams of exemplary light strings similar to those shown in FIGS. 12*a*-*c* but each with a function controller 1214 at the plug end of circuit to reduce voltage and control the lighting scheme of the LED light string 1216.

FIG. 12*e* illustrates circuit diagrams of exemplary light strings 1220 similar to those shown in FIGS. 12*a*-*d* but with dual color LEDs 1217 and a dual color function controller 1218 at the plug end of circuit to reduce voltage and control the lighting scheme of the LED light string 1220. The dual color function controller 1218 can provide a two-color lighting scheme for the LED light string 1220.

FIG. 12*f* illustrates circuit diagrams of exemplary light strings 1224 similar to those shown in FIGS. 12*a*-*e* but each with a RGB color function controller 1222 at the plug end of circuit to reduce voltage and control the lighting scheme of the LED light string 1224. The RGB function controller 1222 can provide an RGB lighting scheme of the LED light string 1224.

The circuits illustrated in FIGS. 12*g*, 12*h*, 12*i*, 12*j*, 12*k* also use 4-wire flat cables with two-pole SMD LEDs soldered to two of the four wires of each flat cable. By cutting off the wires at the positions (e.g., 1226 in FIG. 12*g*) shown in the figures, n LEDs (e.g., 1228 in FIG. 12*g*) are connected in series, and then connected in parallel to the main power supply (e.g., 1230 in FIG. 12*g*). This enables a continuous connection of multiple LEDs on a light string for lighting.

Similar to the circuits shown in FIGS. 12*a*, 12*b*, 12*d*, 12*e*, 12*f*, the various light strings of FIGS. 12*g*, 12*h*, 12*i*, 12*j*, 12*k* incorporate resistor(s), capacitor(s), and/or other electronics to adjust voltage so they can be directly plugged into 100V-230V power supplies. In some embodiments shown in FIGS. 12*i*-12*k*, the circuits can include functional controllers for controlling the LEDs of the light strings.

FIG. 12*l* illustrates a circuit diagram of an exemplary light string, according to an embodiment of the disclosure. The light string uses a 4-wire flat cable 1232 with two-pole SMD LEDs 1234 soldered on the flat cable 1232. The voltage of the circuit is stepped down from 100V-230V to 3V-5V by resistors or combinations of resistors and capacitors of the "reduce voltage+rectifier box" 1236 so the light strip can be directly plugged into the power supply to be powered on. In one embodiment, between 1 and 1000 LEDs can be connected as shown in the illustrated circuit.

FIGS. 12*m*-12*o* illustrate circuits similar to the circuit shown in FIG. 12*l*, but each with a different function controller box for controlling the circuits. For example, circuit 1238 of FIG. 12*m* includes a "reduce voltage+function controller box" to reduce the voltage and provide control signals to the circuit 1238. Circuit 1242 of FIG. 12*n* includes a "reduce voltage+dual color LED function controller box" 1244 to reduce the voltage and control dual color electrodeless LEDs for multifunctional use. Circuit 1246 of FIG. 12*o* includes a "reduce voltage+RGB LED function controller box 1248 to reduce the voltage and control RGB sync flash LEDs for multifunctional use.

FIG. 12*p* illustrates a circuit of a light string adopting a 5-wire flat cable 1252 with SMD LEDs 1250 soldered on three of the 5 wires of the flat cable 1252. All LEDs 1250 are connected in parallel to a string of lights. The voltage is stepped down from 100V-230V to 3V-5V by resistors or a combination of resistor(s) and capacitor(s) so the light strip can be directly plugged into the power supply to be powered on and connected in multiple strings to light up. The circuit can include a "reduce voltage+Code 0 RGB LED function controller box" 1254 that reduces the voltage and controls the Code 0 RGB LEDs for multifunctional use. In one embodiment, the circuit can include between 1 and 1000 LEDs.

Figure 13:
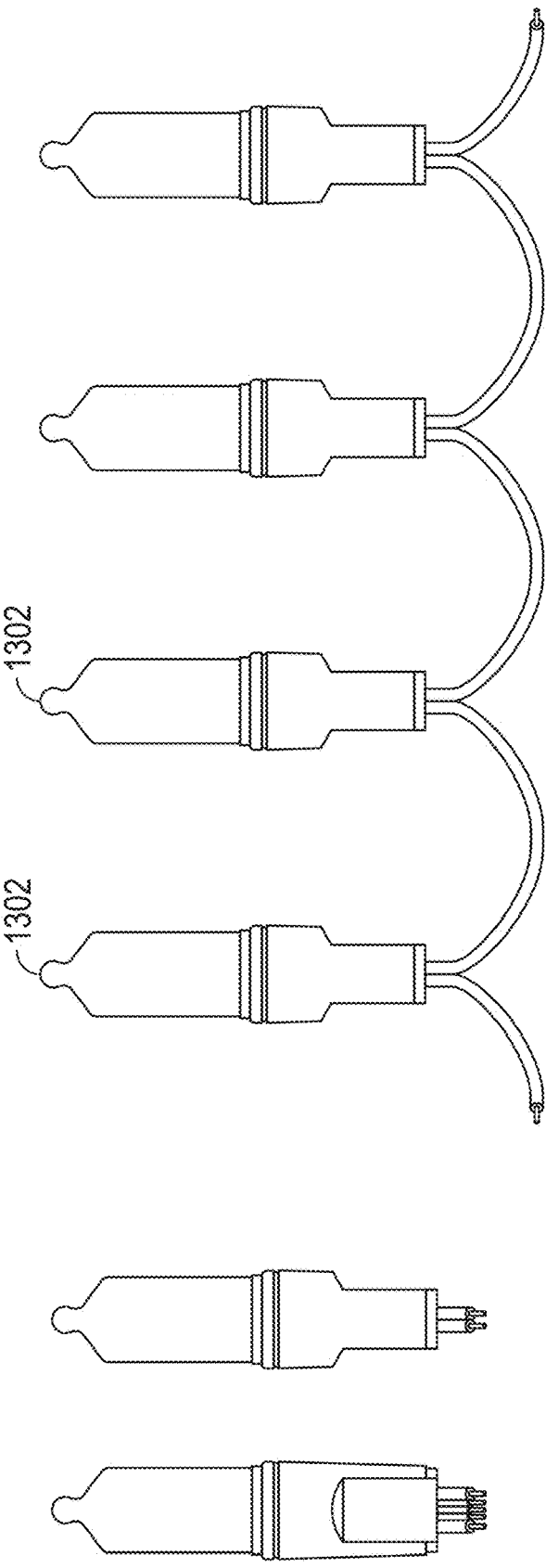
FIG. 13 illustrates an exemplary string light with light heads/light shades being combined with the LEDs, according to an embodiment of the disclosure.

The various embodiments of the light strings of FIGS. 12*a*-12*p* above can be combined with various light heads and/or light shades (e.g., 1302 of FIG. 13) to achieve different effects.

FIG. 14*a* is a schematic diagram of an exemplary assembly of the LED light strip 1400 with light heads and outfits 1402, according to an embodiment of the disclosure. The light various heads and outfits 1402 can encapsulate the LEDs 1404 of the light strip 1400 to achieve different lighting effects. FIG. 14*b* illustrates an exemplary LED light 1404' of FIG. 14*a*.

Figure 15:
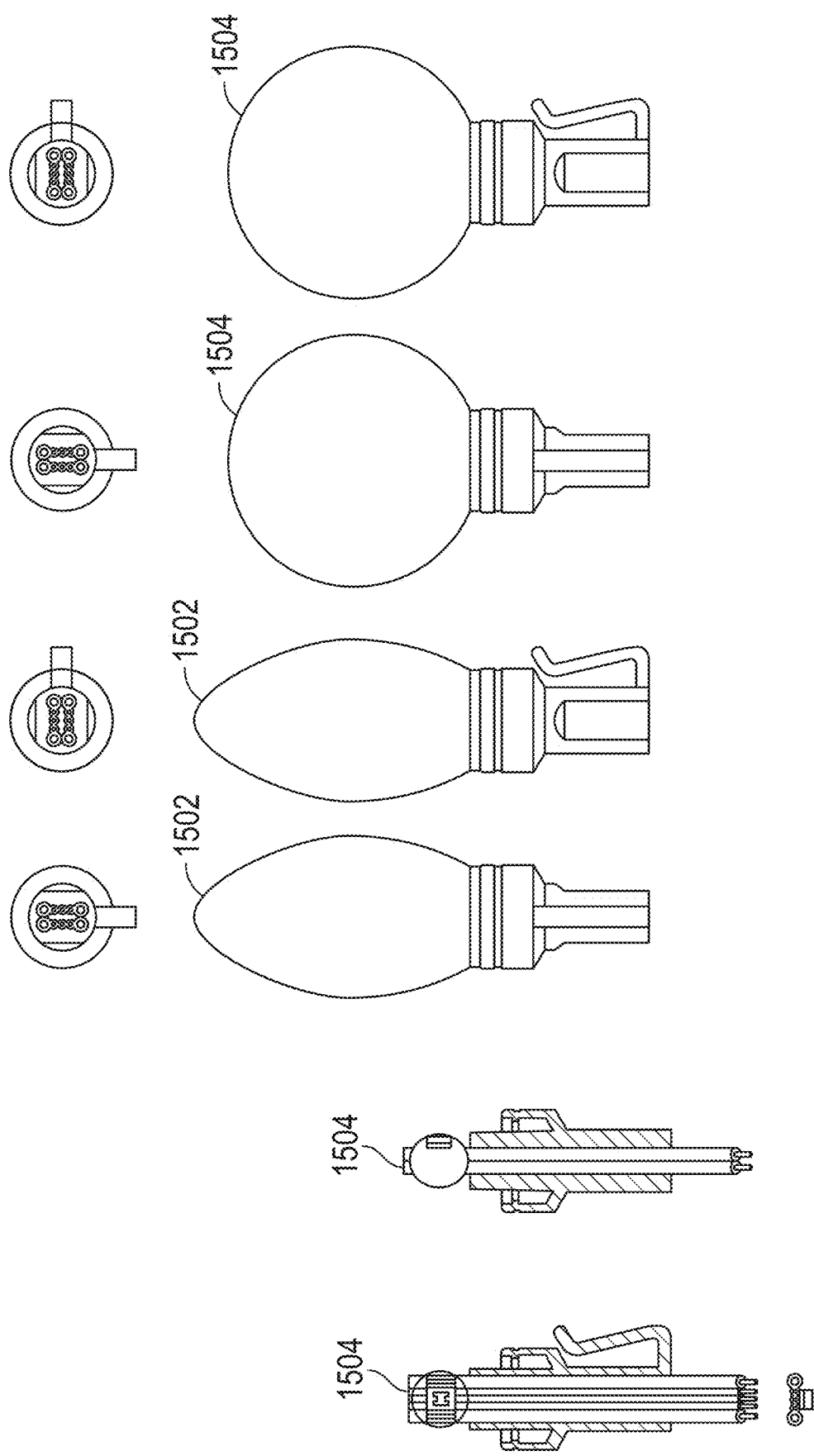
FIG. 15 illustrates different views of two light heads that can be combined with the LEDs of a strong light, according to an embodiment of the disclosure.

FIG. 15 illustrates different views of two light heads 1500, 1502 that can be combined with the LEDs 1504 of a strong light.

Figure 16:
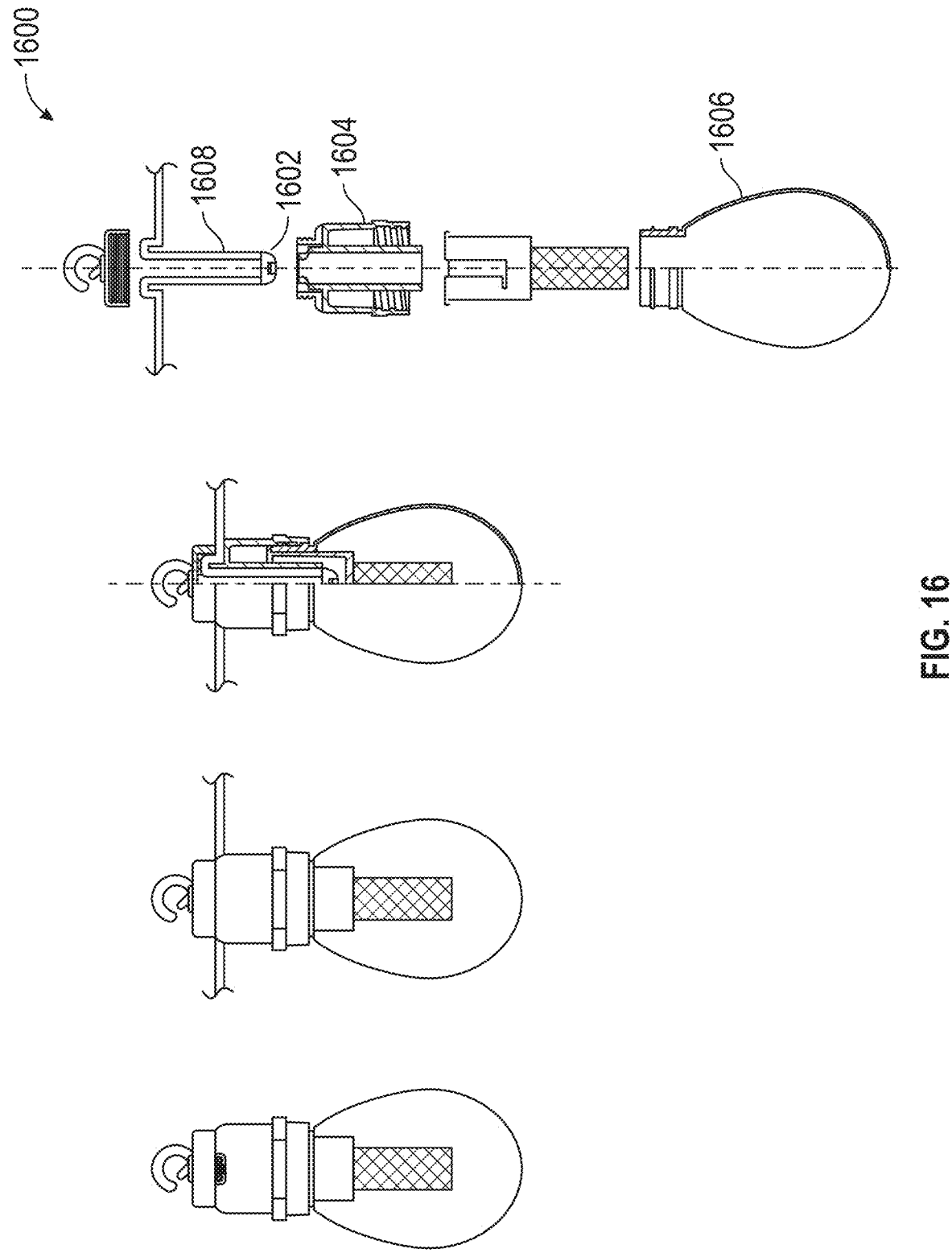
FIG. 16 is a schematic diagram of another assembly of the light strip with light heads and outfits.

FIG. 16 is a schematic diagram of another assembly of the light strip with light heads and outfits. Because the flat cable 1608 of the light string 1600 is flexible and can be folded, an LED chip 1602 on the light string 1600 can be fitted within a base 1604 of the light assembly. A light head 1006 can be screwed on top of the base 1604 to achieve a lighting effect.

Figure 17A:
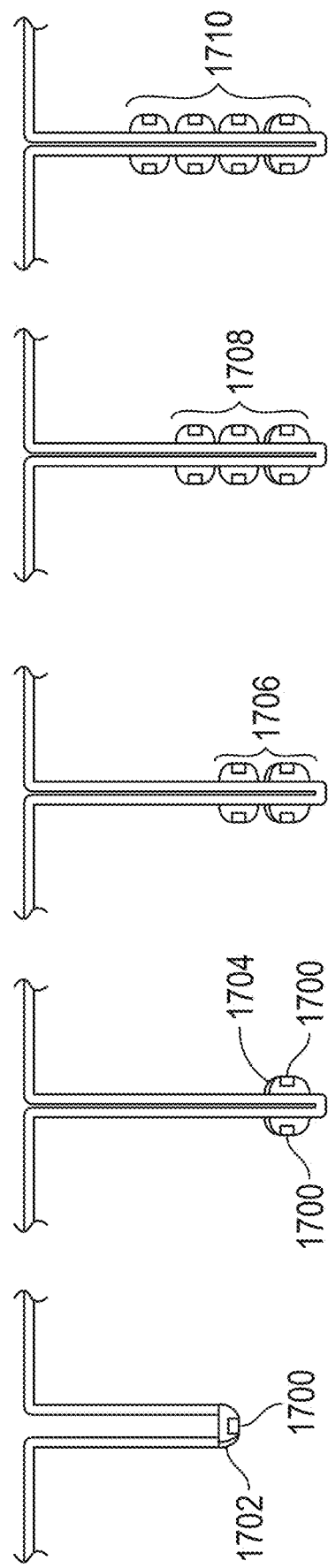
FIGS. 17a-17c illustrate exemplary application of the LED string lights disclosed herein.
Figure 17B:
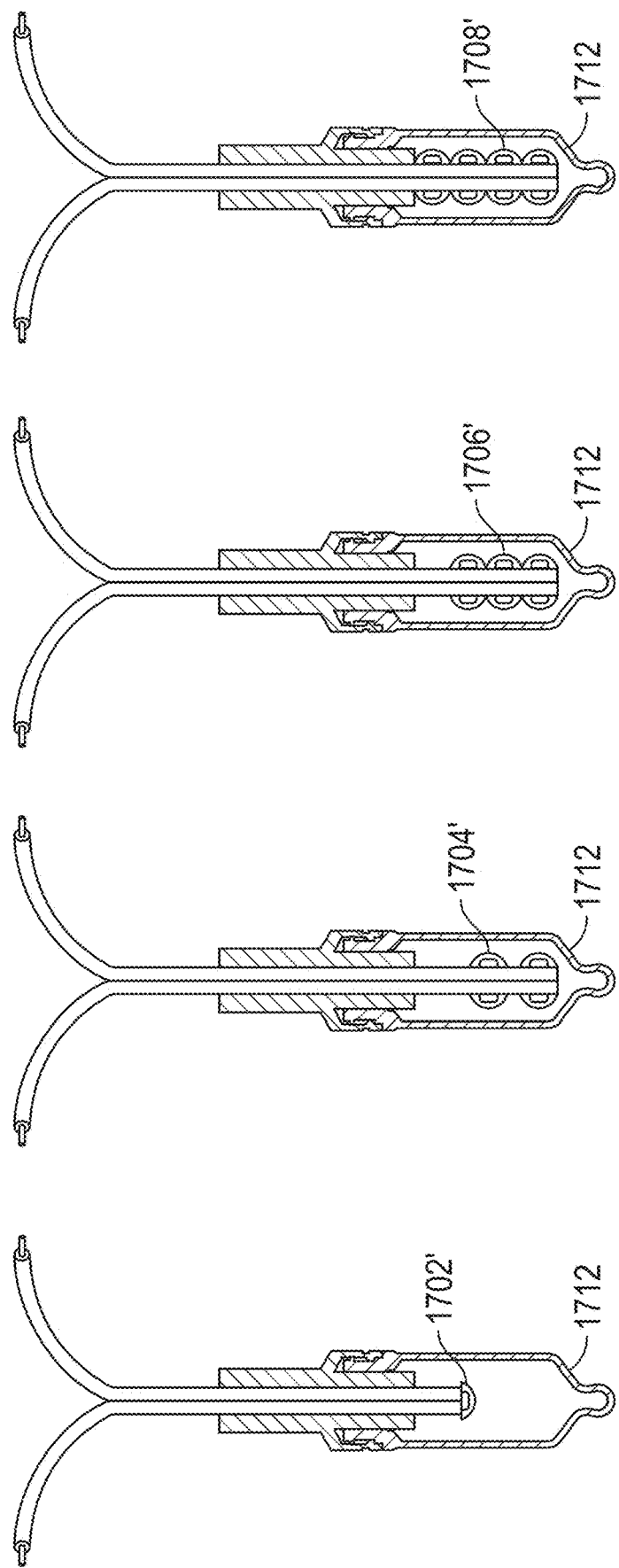
Figure 17C:
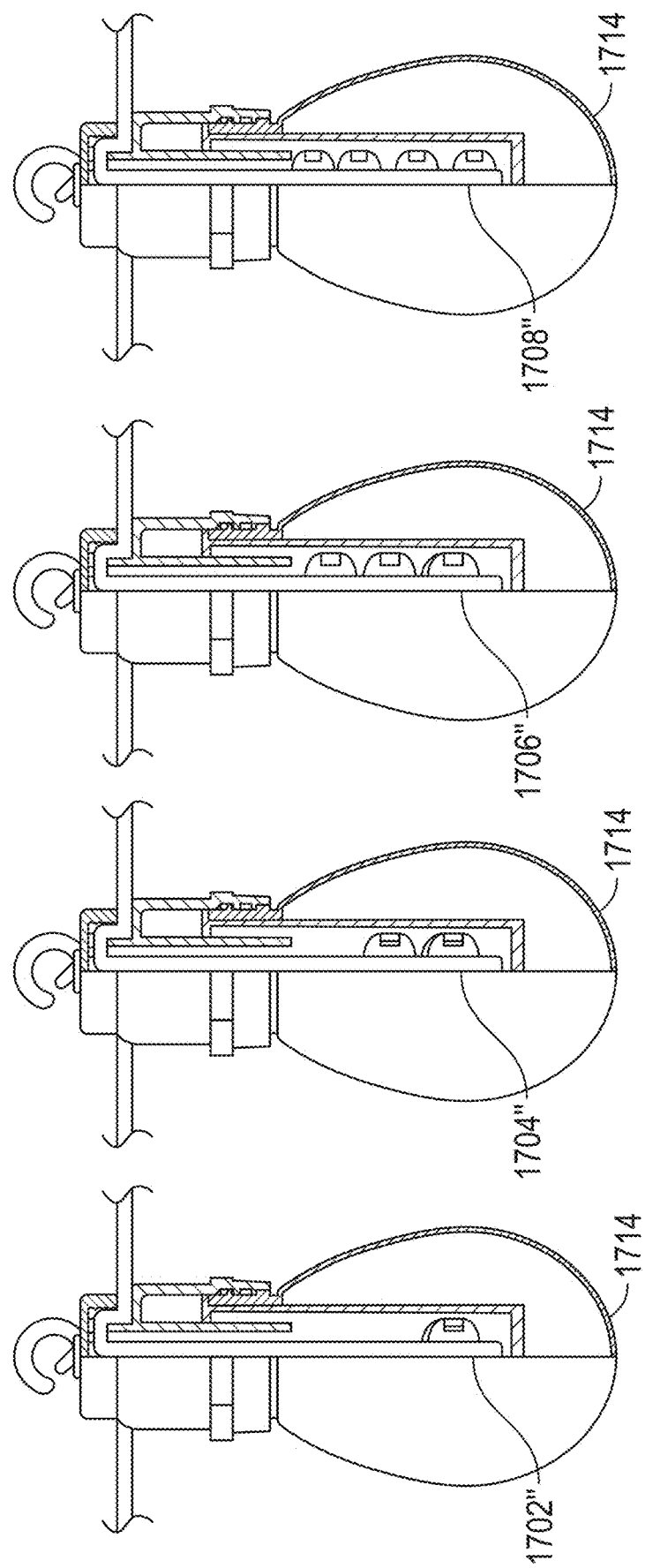

FIGS. 17*a*-17*c* illustrate exemplary application of the LED string lights disclosed herein. FIG. 17*a* illustrates different numbers of LED chips 1700 on a light string being grouped to form different light sources. From left to right, the light sources 1702, 1704, 1706, 1708, 1710 can be formed by 1, 2, 4, 6, and 8 LED chips, respectively. FIG. 17*b* illustrates the light sources 1702', 1704', 1706', 1708' being combined with light heads 1712. FIG. 17*c* provides a sectional view of the grouped LED chips 1702", 1704", 1706", 1708" being housed in their respective light heads (collectively 1714).

Figure 18A:
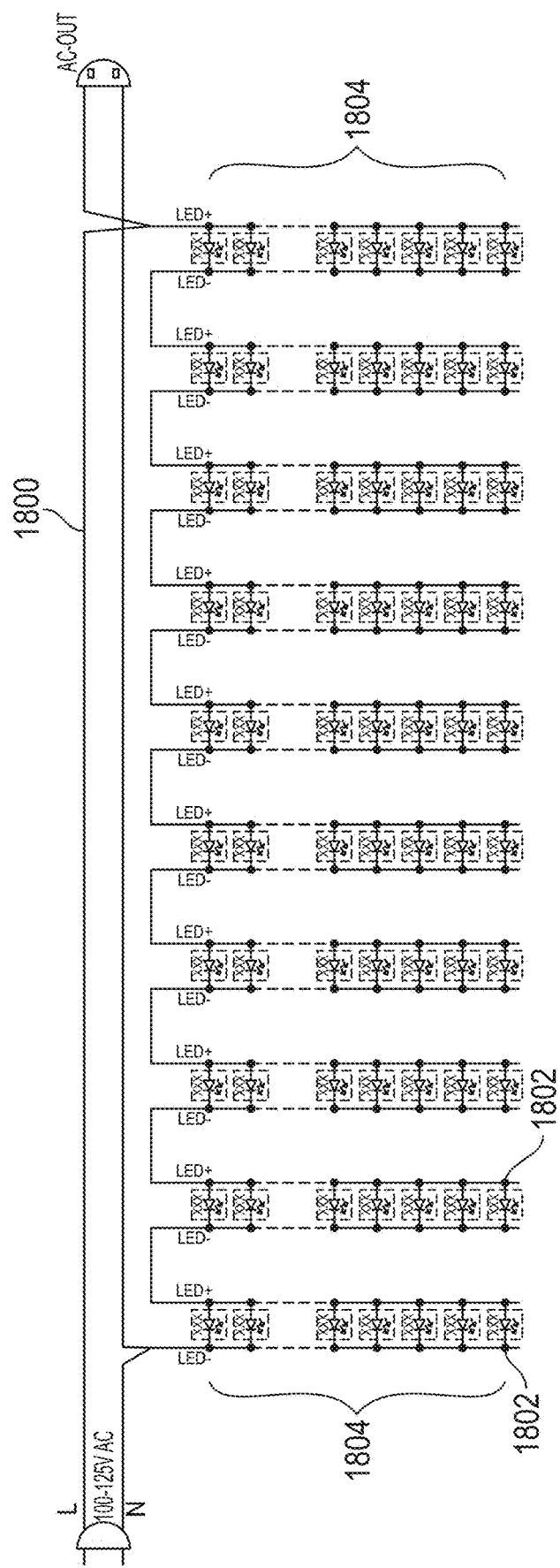
FIG. 18a is a circuit diagram illustrating groups of LEDs on a single light string forming a number of connected light sources, according to an embodiment of the disclosure.
Figure 18B:
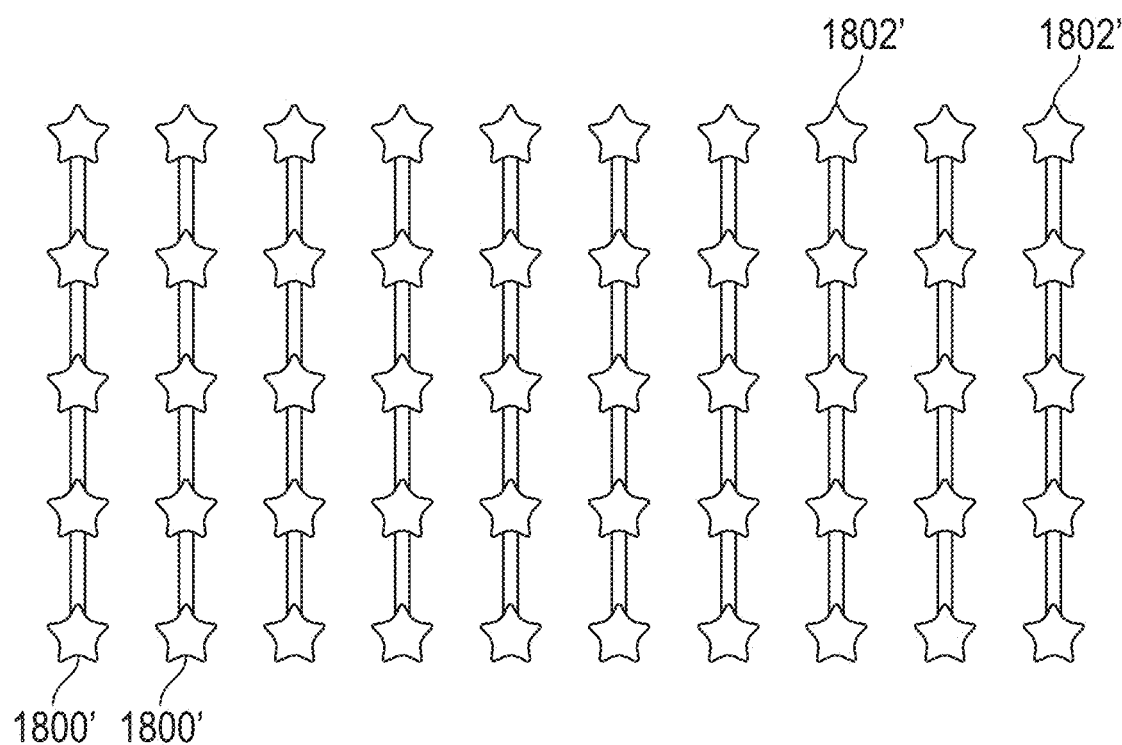
FIGS. 18b and 18c illustrate different grouping of LEDs on light strings, according to an embodiment of the disclosure.
Figure 18C:
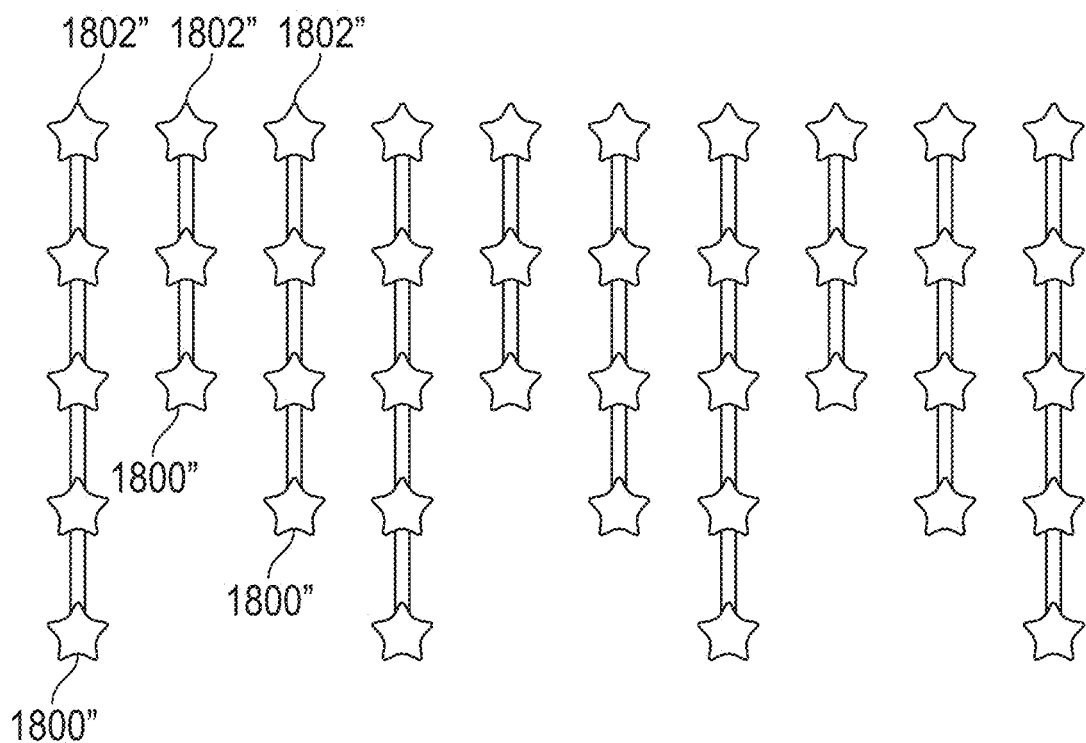

FIG. 18*a* is a circuit diagram illustrating groups of LEDs (collectively 1802) on a single light string 1800 forming a number of connected light sources (collectively 1804). The single light string 1800 can be plugged directly into a 100V-230V power source. As illustrated in FIGS. 18*b* and 18*c*, respectively, each group 1800', 1800" of LEDs (collectively 1802', 1802") can have the same or different number of LED chips.

Figure 19A:
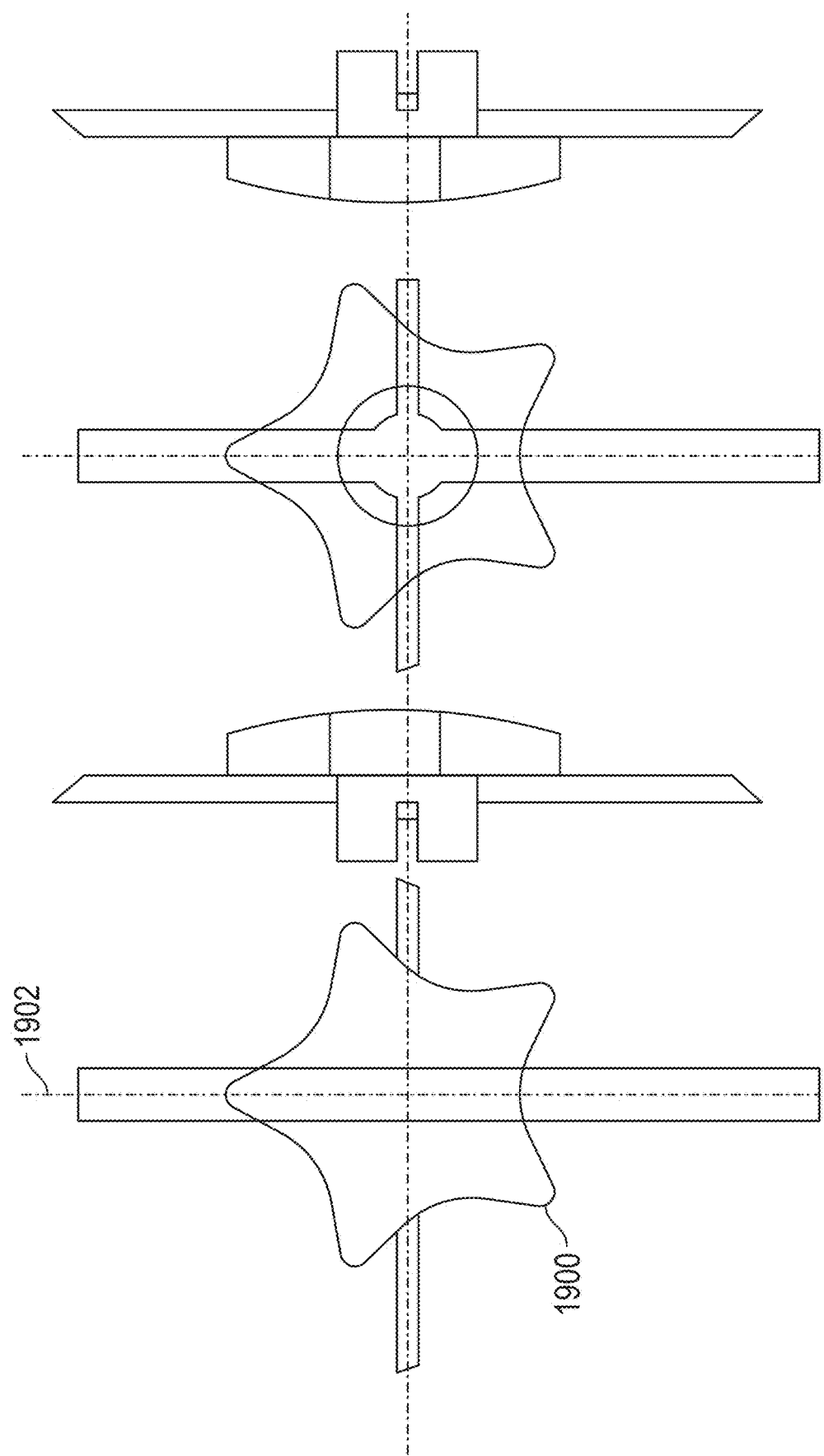
FIG. 19a illustrates special fasteners used for clamping and support wires to form a light string, according to embodiments of the disclosure.
Figure 19B:
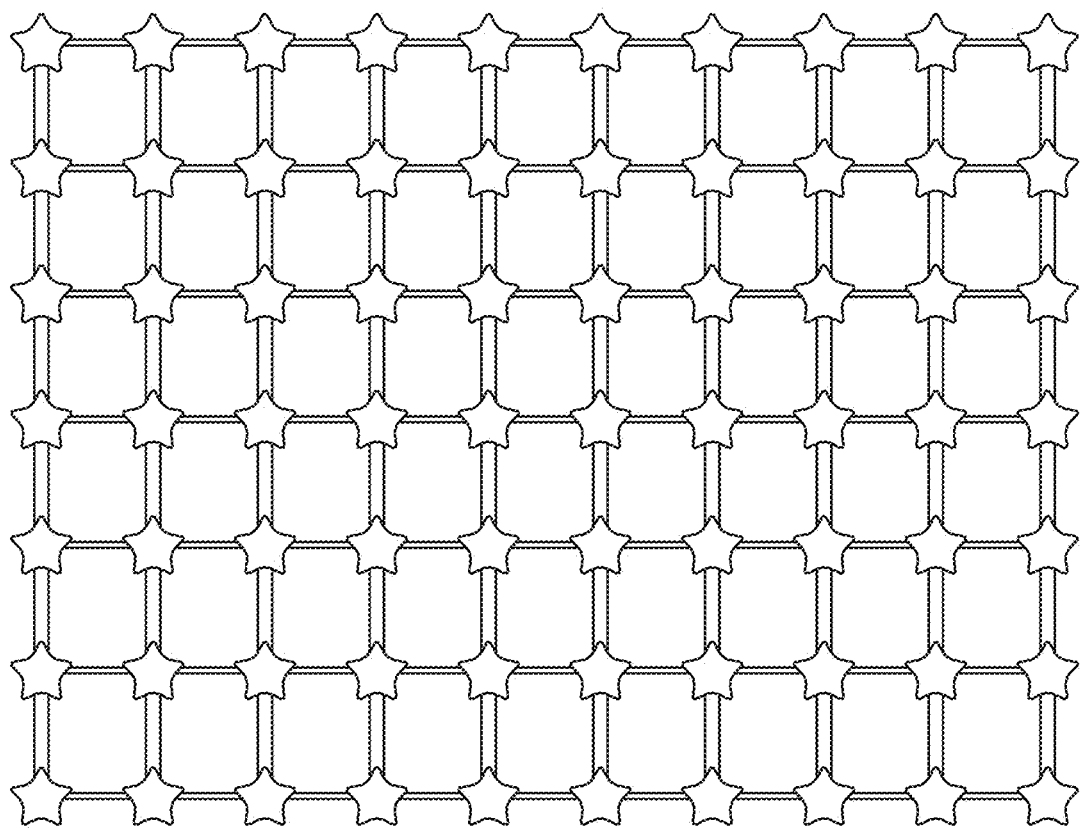
FIG. 19b illustrates a net lights, according to an embodiment of the disclosure.

FIG. 19*a* illustrates, from different viewpoints, special fasteners 1900 used for clamping and support wires 1902 to form net lights such as those shown in FIG. 19*b*. As illustrated in FIG. 19*a*, the shape of the fasteners 1900 can be star shaped, spherical, or any other shape. The net lighting 1910 can include a matrix of LEDs (collectively 1912) that are connected by horizontal cables 1914 and vertical cables 1916. Either the horizontal cables 1914 or the vertical cables 1916 can be the 4-wire or 5-wire flat cables discussed above, with some of the wires in the flat cables cut at certain locations to form parallel and/or series connections as detailed in the embodiments discussed above. If the vertical cables 1916 are the 4-wire or 5-wire flat cables running electricity, the horizontal cables 1914 would be dummy cables whose main function is to form the "net," and vice versa.

Figure 20:
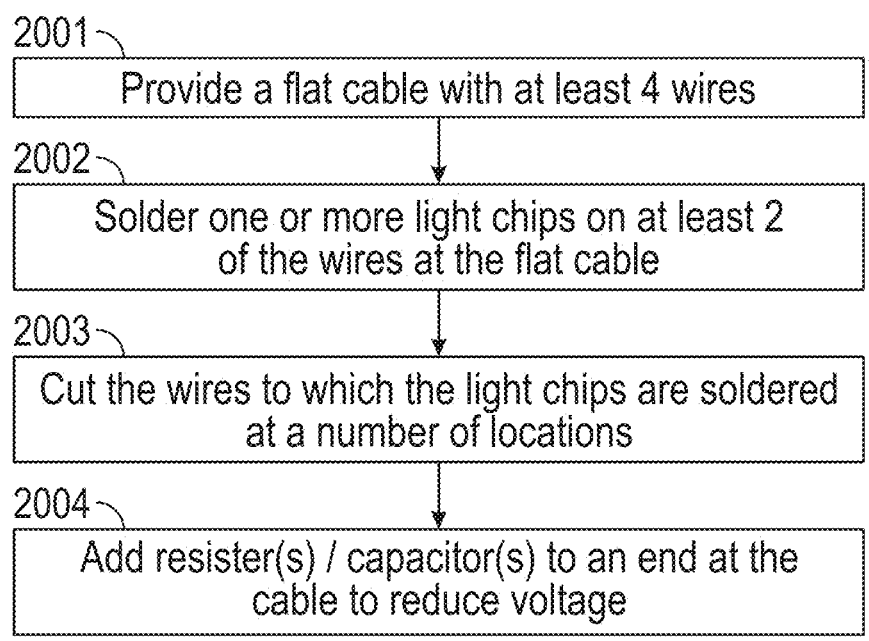
FIG. 20 is a flow chart illustrating the exemplary steps in a method of making a string light, according to an embodiment of the disclosure.

FIG. 20 is a flow chart illustrating the exemplary steps in a method of making a string light, according to an embodiment of the disclosure. First, a flat cable including at least 4 wires is provided. (Step 2001) The flat cable can be a 4-wire or 5-wire flat cable. Next, one or more light chips (e.g., LED chips) can be soldered on at least 2 of the wires of the flat cable. (Step 2002) Depending on whether a 4-wire or 5-wire flat cable is used, each light chip can be soldered on 2 or 3 wires of the flat cable, respectively. The wires on which the light chips are soldered are cut at a number of locations to create different connections among the light chips. (Step 2003) Finally, the voltage of the flat cable can be reduced by adding resistor(s) or a combination of resistor(s) and capacitor(s) to an end of the cable. (Step 2004)

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. A method of making a string light comprising:
   providing a flat cable comprising at least 4 wires;
   soldering one or more light chips to at least 2 of the at least 4 wires of the flat cable;
   cutting the at least 2 of the at least 4 wires at a plurality of locations; and
   connecting a voltage reducing box to the wires.

2. The method of claim 1, wherein the voltage reducing box comprises a resistor.

3. The method of claim 1, wherein the voltage reducing box comprises a combination of at least one resistor and at least one capacitor.

4. The method of claim 1,
   wherein the at least 4 wires comprise 2 outer wires and 2 inner wires, the 2 outer wires thicker than the 2 inner wires;
   wherein each of the one or more light chips comprises 2 poles; and
   wherein soldering the one or more light chips to at least 2 of the at least 4 wires of the flat cable comprises soldering one of the poles to one of the inner wires and the other pole to the other inner wire of the flat cable.

5. The method of claim 1,
   wherein the at least 4 wires comprise 2 wires on a first side of the flat cable and 2 wires on a second side of the flat cable, the 2 wires on the first side thicker than the 2 wires on the second side;
   wherein each of the one or more light chips comprises 2 poles; and
   wherein soldering the one or more light chips to at least 2 of the at least 4 wires of the flat cable comprises soldering one of the poles to one of the 2 wires on the second side and the other pole to the other wire on the second side of the flat cable.

6. The method of claim 5, wherein each of the one or more light chips comprises a two-pole LED chip.

7. The method of claim 1,
   wherein the at least 4 wires comprise 2 outer wires and 3 inner wires, the 2 outer wires thicker than the 3 inner wires;
   wherein each of the one or more light chips comprises a ground, a 5 volt power, and a data input; and
   wherein soldering the one or more light chips to at least 2 of the 4 wires of the flat cable comprises soldering the ground, the 5 volt power, and the data input of each of the light chips on a respective inner wire of the flat cable.

8. The method of claim 1,
   wherein the at least 4 wires comprise 2 wires on a first side of the flat cable and 3 wires on a second side of the flat cable, the 2 wires on the first side thicker than the 3 wires on the second side;
   wherein each of the one or more light chips comprises a ground, a 5 volt power, and a data input; and
   wherein soldering the one or more light chips to at least 2 of the at least 4 wires of the flat cable comprises soldering the ground, the 5 volt power, and the data input of each of the one or more light chips on a respective wire on the second side of the flat cable.

9. The method of claim 1, further comprising connecting a function controller to the flat cable, the function controller configured to control an operation of the string light.

10. The method of claim 1, further comprising connecting a dual color function controller to the flat cable, the dual color function controller configured to control dual color polarless LEDs for multifunctional use.

11. The method of claim 1, further comprising connecting an RGB function controller to the flat cable, the RGB function controller configured to control RGB sync flash LEDs for multifunctional use.

12. The method of claim 1, wherein the voltage reducing box reduces the voltage of the string light to between 100V and 230V.

13. The method of claim 1, wherein the one or more light chips comprise at least 2 light chips; and wherein at least 2 of the at least 2 light chips are connected in parallel.

14. The method of claim 13, wherein flat cable comprises at least 5 wires; and wherein the voltage reducing box comprises a reduce voltage and Code 0 RGB LED function control box.

15. The method of claim 1, further comprising encapsulating each of the one or more light chips with a light head.

16. The method of claim 1, wherein the one or more light chips comprise at least 2 light chips; and the method further comprises grouping the at least 2 light chips into at least one light source.

17. The method of claim 16, wherein each of the plurality of light sources comprises a same number of light chips.

18. The method of claim 16, wherein at least two of the plurality of light sources comprise a different number of light chips.

19. The method of claim 1, further comprising clamping the at least 4 wires with fasteners to form light sources.

* * * * *